United States Patent
Hotchkiss et al.

(10) Patent No.: US 11,496,902 B2
(45) Date of Patent: Nov. 8, 2022

(54) ACCESS TO WI-FI NETWORKS VIA TWO-STEP AND TWO-PARTY CONTROL

(71) Applicant: Plume Design, Inc., Palo Alto, CA (US)

(72) Inventors: Adam R. Hotchkiss, Dallas, TX (US); Abhishek Kumar, Hayward, CA (US); Paul White, Burlingame, CA (US); Arun Kalmanje, Fremont, CA (US); Metod Medja, Črnivec (SI); Sandeep Jain, Santa Clara, CA (US)

(73) Assignee: Plume Design, Inc., Palo Alto, CA (US)

( * ) Notice: Subject to any disclaimer, the term of this patent is extended or adjusted under 35 U.S.C. 154(b) by 169 days.

(21) Appl. No.: 17/101,301

(22) Filed: Nov. 23, 2020

(65) Prior Publication Data
US 2021/0076216 A1    Mar. 11, 2021

Related U.S. Application Data

(63) Continuation-in-part of application No. 15/825,242, filed on Nov. 29, 2017.
(Continued)

(51) Int. Cl.
*H04W 12/086* (2021.01)
*H04W 68/00* (2009.01)
(Continued)

(52) U.S. Cl.
CPC ....... *H04W 12/086* (2021.01); *H04W 12/082* (2021.01); *H04W 12/68* (2021.01);
(Continued)

(58) Field of Classification Search
CPC . H04W 12/086; H04W 12/68; H04W 12/082; H04W 12/71; H04W 68/005
(Continued)

(56) References Cited

U.S. PATENT DOCUMENTS 7,574,202 B1    8/2009  Tsao et al.
8,069,166 B2 *  11/2011 Alvarado ............. G06Q 10/109
                                                          707/723
(Continued)

FOREIGN PATENT DOCUMENTS

WO    2004084458 A2    9/2004
WO    2016/176422 A1   11/2016

OTHER PUBLICATIONS

Feb. 15, 2019, International Search Report for International Application No. PCT/US2018/051348.
(Continued)

*Primary Examiner* — Dant B Shaifer Harriman
(74) *Attorney, Agent, or Firm* — Clements Bernard Baratta; Lawrence A. Baratta, Jr.

(57) ABSTRACT

Systems and methods include, responsive to a Wi-Fi client device providing a password for a zone of a Wi-Fi network, determining a status of the Wi-Fi client device; when the status is unknown, placing the client device in a holding area associated with the zone, wherein the client device is connected to the Wi-Fi network while in the holding area and has restricted access that is less than full access to the zone in an allowed zone; responsive to placing the client device in the holding area, causing a notification to an administrator that the client device is in the holding area; and with the client device in the holding area, one of moving the Wi-Fi client device to the allowed area, moving the client device to a rejected area for the zone, and leaving the client device in the holding zone, based on any input or lack thereof.

20 Claims, 33 Drawing Sheets

Related U.S. Application Data

(60) Provisional application No. 62/565,418, filed on Sep. 29, 2017.

(51) Int. Cl.
 *H04W 12/68* (2021.01)
 *H04W 12/71* (2021.01)
 *H04W 12/082* (2021.01)
 *H04W 84/12* (2009.01)

(52) U.S. Cl.
 CPC ......... *H04W 12/71* (2021.01); *H04W 68/005* (2013.01); *H04W 84/12* (2013.01)

(58) Field of Classification Search
 USPC .............................................................. 726/4
 See application file for complete search history.

(56) References Cited

U.S. PATENT DOCUMENTS

| | | | |
|---|---|---|---|
| 8,122,251 B2 | 2/2012 | Santos et al. | |
| 8,855,065 B2 * | 10/2014 | Welch | H04W 16/18 455/562.1 |
| 9,955,352 B2 * | 4/2018 | Mahaffey | G06F 21/316 |
| 10,356,591 B1 * | 7/2019 | Tengwall | H04W 4/02 |
| 10,419,936 B2 * | 9/2019 | Mahaffey | H04W 4/025 |
| 10,623,960 B2 * | 4/2020 | Mahaffey | H04W 12/126 |
| 10,657,788 B1 * | 5/2020 | Chou | G08B 21/10 |
| 10,834,523 B1 * | 11/2020 | Rao | B64C 39/024 |
| 2002/0062252 A1 | 5/2002 | Van Zoest et al. | |
| 2002/0138843 A1 | 9/2002 | Samaan et al. | |
| 2007/0286195 A1 | 12/2007 | Ilnickl et al. | |
| 2007/0288319 A1 | 12/2007 | Robinson et al. | |
| 2008/0133708 A1 * | 6/2008 | Alvarado | H04L 51/04 709/218 |
| 2011/0030037 A1 | 2/2011 | Olshansky et al. | |
| 2012/0167185 A1 | 6/2012 | Menezes et al. | |
| 2013/0052992 A1 | 2/2013 | Lee et al. | |
| 2013/0115915 A1 | 5/2013 | Tipton et al. | |
| 2013/0173702 A1 | 7/2013 | Lang et al. | |
| 2014/0074896 A1 | 3/2014 | Bushman et al. | |
| 2014/0215583 A1 | 7/2014 | Ding | |
| 2014/0247941 A1 | 9/2014 | Gu et al. | |
| 2014/0289049 A1 * | 9/2014 | Van Boucq | H04L 67/52 705/14.58 |
| 2014/0351392 A1 * | 11/2014 | Baker | H04L 41/0896 709/220 |
| 2015/0023338 A1 * | 1/2015 | Welch | H04W 16/18 370/338 |
| 2015/0221149 A1 | 8/2015 | Main et al. | |
| 2015/0302479 A1 * | 10/2015 | Cheng | G06Q 30/0267 705/14.58 |
| 2016/0198501 A1 | 7/2016 | Verkaik et al. | |
| 2016/0218937 A1 * | 7/2016 | Millington | H04L 12/2809 |
| 2016/0219112 A1 * | 7/2016 | Millington | H04W 12/04 |
| 2016/0234179 A1 | 8/2016 | Gatewood et al. | |
| 2016/0270101 A1 | 9/2016 | Lee et al. | |
| 2017/0118644 A1 * | 4/2017 | Le Moan | H04L 63/083 |
| 2017/0126692 A1 * | 5/2017 | Stuntebeck | G06F 3/0481 |
| 2017/0272317 A1 | 9/2017 | Singla et al. | |
| 2019/0104411 A1 * | 4/2019 | Hotchkiss | H04L 63/107 |
| 2020/0127972 A1 * | 4/2020 | Aldossary | H04L 63/029 |
| 2021/0076216 A1 * | 3/2021 | Hotchkiss | H04W 12/63 |
| 2021/0185534 A1 * | 6/2021 | Vankieken | H04W 12/73 |

OTHER PUBLICATIONS

Apr. 4, 2022, European Search Report issued for European Application No. EP 21 20 9919.

* cited by examiner

Single SSID, Multi Password onboarding
iOS 1.1 Physical Proximity

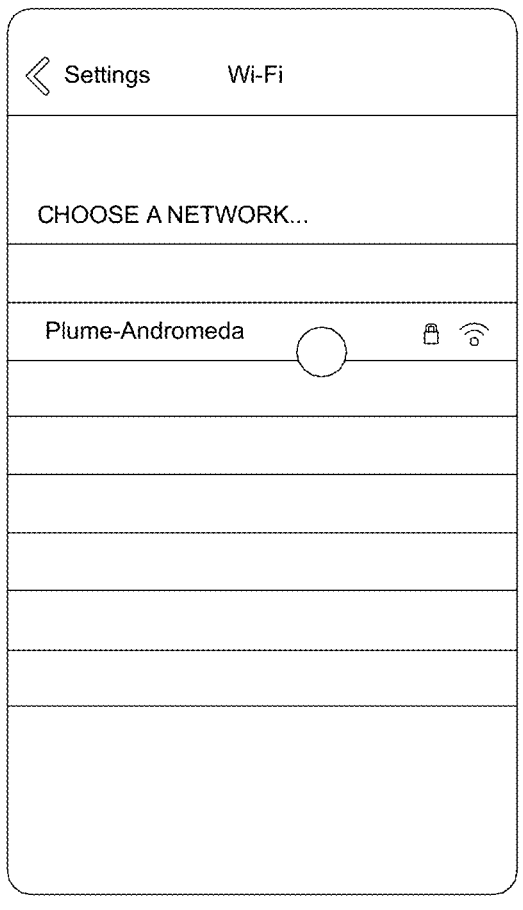

GUEST

Enter the password for "Plume-Andromeda"

Cancel    Enter Password    Join

Password |

You can request access to this Wi-Fi network by holding your iPhone near an unlocked IOS device or Mac that has the password.

GUEST
OPTION 1

Jen just use your phone number as password.

OPTION 2

Jen, the password is "friends".

Andy says

Andy says

FIG. 15A

Guest pastes in the password
or types it in manually.

FIG. 24B

ACCESS TO WI-FI NETWORKS VIA TWO-STEP AND TWO-PARTY CONTROL

CROSS-REFERENCE TO RELATED APPLICATION(S)

The present patent/application claims is a continuation-in-part to U.S. patent application Ser. No. 15/825,242, filed Nov. 29, 2017, and entitled "CONTROLLED GUEST ACCESS TO WI-FI NETWORKS," which claims priority to U.S. Provisional Patent Application No. 62/565,418, filed on Sep. 29, 2017, and entitled "CONTROLLED GUEST ACCESS TO WI-FI NETWORKS," the contents of each are incorporated by reference in their entirety.

FIELD OF THE DISCLOSURE

The present disclosure generally relates to wireless networking systems and methods. More particularly, the present disclosure relates to access to Wi-Fi networks, such as operated by businesses, by two-step and two-party control.

BACKGROUND OF THE DISCLOSURE

Wi-Fi networks (i.e., Wireless Local Area Networks (WLAN) based on the IEEE 802.11 standards) have become ubiquitous. People use them in their homes, at work, and in public spaces such as schools, cafes, even parks. Wi-Fi provides great convenience by eliminating wires and allowing for mobility. The applications that consumers run over Wi-Fi is continually expanding. Today people use Wi-Fi to carry all sorts of media, including video traffic, audio traffic, telephone calls, video conferencing, online gaming, and security camera video. Often traditional data services are also simultaneously in use, such as web browsing, file upload/download, disk drive backups, and any number of mobile device applications. In fact, Wi-Fi has become the primary connection between user devices and the Internet in the home or other locations. The vast majority of connected devices use Wi-Fi for their primary network connectivity.

In Wi-Fi networks, similar to wired Local Area Network (LAN) networks, once a user device is connected (or plugged into a LAN), the user device has full access on the network. Thus, any connected user device can access any device or resources on the network. For example, when a user device is connected to a Wi-Fi network through its a Service Set Identifier (SSID) (network ID) that user device can access any device or resource also on the SSID. There is a use case for so-called guest access to Wi-Fi networks where user devices can connect to the Wi-Fi network for limited purposes, such as Internet access only, access to select devices or resources, etc.

The conventional approach to guest access in Wi-Fi networks utilizes a separate SSID and password for guest access. For example, the main Wi-Fi network can be HOME whereas a separate SSID is setup for HOME GUEST. However, this approach has disadvantages including the use of multiple SSIDs, inability to offer selective access to guest user devices to devices or resources on the main Wi-Fi network, etc.

Also, businesses deploy Wi-Fi networks in their offices, stores, warehouses, and the like, for customers, employees, contractors, etc. Enterprise Wi-Fi systems are available but tend to require full-time management by the business. This is typically acceptable in large businesses, with full-time Information Technology (IT) personnel on staff, but not for a small or medium size business where often the business owner is tasked with managing IT. In this situation, enterprise Wi-Fi systems are often overkill in terms of functionality and management requirements. It is not feasible for a business owner to allow/block every user that gets on the business's Wi-Fi network. Their objective is running the business, not performing IT. There is a need for a Wi-Fi network that meets the needs and objectives of small and medium-sized businesses. That is, an approach that balances security and ease of operation.

BRIEF SUMMARY OF THE DISCLOSURE

The present disclosure relates to access to Wi-Fi networks, such as operated by businesses, by two-step and two-party control. The controlled access includes multiple zones with access privileges and with convenient ways for user devices to connect to the appropriate zones. For example, the zones can include a secure zone, an employee zone, and a guest zone, each can include a unique SSID or the same SSID. Each zone can include a password along with the SSID for security. Once in the corresponding zone, a user device is placed in a holding area ("purgatory") where a notification is sent and/or a listing is provided in a User Interface (UI) for a network manager. As described herein, the network manager is an administrator, business owner, etc. tasked with managing the Wi-Fi network. The network manager has the option of approving, disapproving, or taking no action with respect to the client device. Approving can provide the user device full access to the zone, i.e., "heaven," whereas disapproving can keep the user device connected, but with no access rights at all, i.e., "hell." Further and conveniently, the user device can remain in the holding zone in perpetuity having some minimal access rights, such as limited Internet access only in the employee zone and the guest zone, but no access in the secure zone. This approach can include remembering user devices for consistent application of policy as they come and go. This approach is referred to as two-step, namely SSID+password and the holding zone, and two-party, namely the user entering the SSID+password and the network administrator addressing the holding zone. Additionally, the present disclosure includes a concept of pin holing where a particular device in one zone is granted some access to another zone. Advantageously, the systems and methods include an approach that is easy to operate and manage while balancing security and user experience.

BRIEF DESCRIPTION OF THE DRAWINGS

The present disclosure is illustrated and described herein with reference to the various drawings, in which like reference numbers are used to denote like system components/method steps, as appropriate, and in which:

FIGS. 15A-15C are a series of screenshots illustrating a single SSID, multiple password (key) onboarding initiated by the guest client;

DETAILED DESCRIPTION OF THE DISCLOSURE

Figure 1:
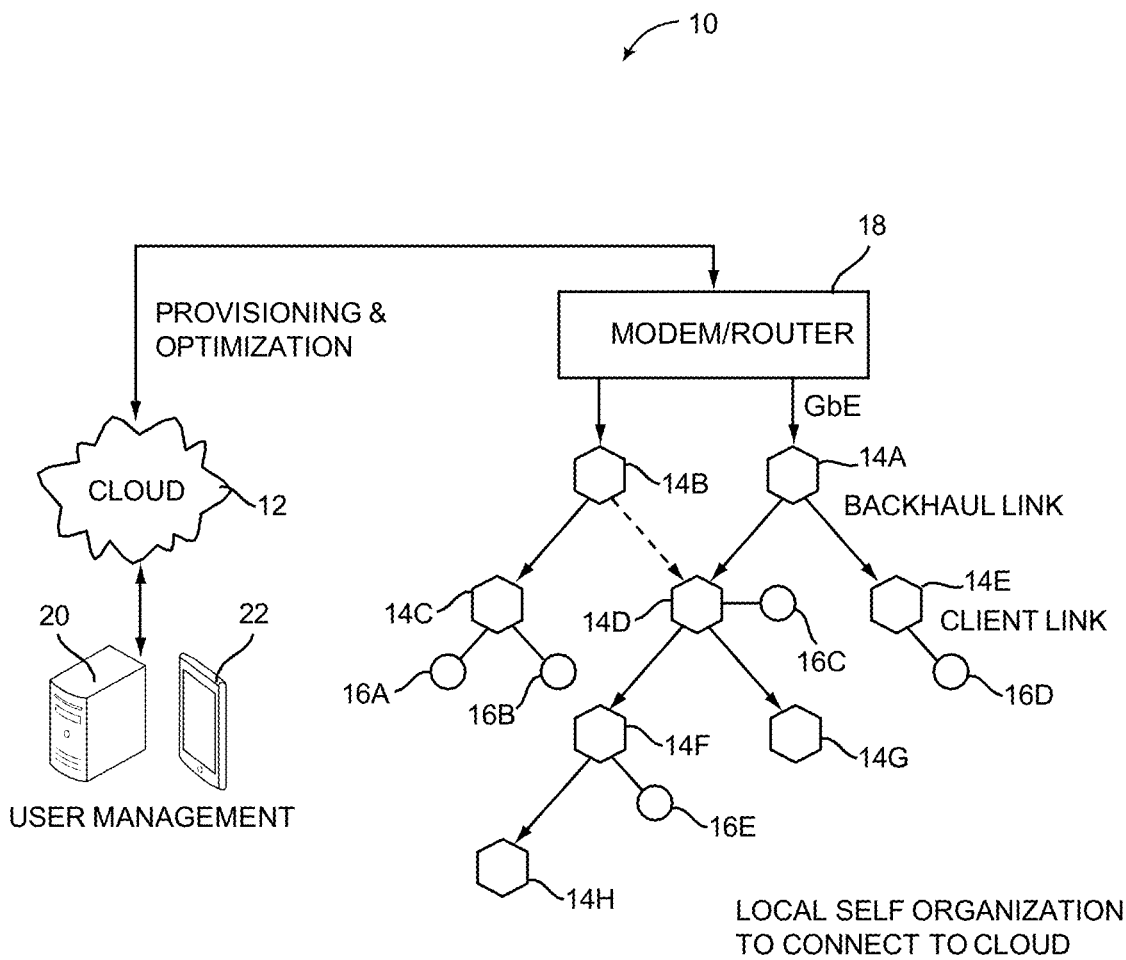
FIG. 1 is a network diagram of a distributed Wi-Fi system with cloud-based control.

Again, the present disclosure relates to access to Wi-Fi networks, such as operated by businesses, by two-step and two-party control. The controlled access includes multiple zones with access privileges and with convenient ways for user devices to connect to the appropriate zones. For example, the zones can include a secure zone, an employee zone, and a guest zone, each can include a unique SSID or the same SSID. Each zone can include a password along with the SSID for security. Once in the corresponding zone, a user device is placed in a holding area ("purgatory") where a notification is sent and/or a listing is provided in a User Interface (UI) for a network manager. As described herein, the network manager is an administrator, business owner, etc. tasked with managing the Wi-Fi network. The network manager has the option of approving, disapproving, or taking no action with respect to the client device. Approving can provide the user device full access to the zone, i.e., "heaven," whereas disapproving can keep the user device connected, but with no access rights at all, i.e., "hell." Further and conveniently, the user device can remain in the holding zone in perpetuity having some minimal access rights, such as limited Internet access only in the employee zone and the guest zone, but no access in the secure zone.

This approach can include remembering user devices for consistent application of policy as they come and go. This approach is referred to as two-step, namely SSID+password and the holding zone, and two-party, namely the user entering the SSID+password and the network administrator addressing the holding zone. Additionally, the present disclosure includes a concept of pin holing where a particular device in one zone is granted some access to another zone. Advantageously, the systems and methods include an approach that is easy to operate and manage while balancing security and user experience.

Also, in various embodiments, the present disclosure relates to systems and methods for controlled guest access to Wi-Fi networks. The systems and methods utilize a single SSID for all users including home (full access) and guest (selective access) users. Specifically, the password for a user serves as a token for the access level, instead of the different SSID. The administrator can set up different zones which are equivalent to an access level. The zones are different sets of devices enabled for different sets of users. For example, a guest user on a home Wi-Fi network may have Internet access and access to a printer, but no access to a door lock, thermostat, etc. in a particular zone. Thus, the Wi-Fi network has a single SSID (e.g., HOME) with multiple different passwords each with an associated access level (zone). Advantageously, the systems and methods use a single SSID with multiple passwords to provide user-level access control to specific devices and resources. Of note, this controlled guest access is typically used for home Wi-Fi networks, hence the use of the single SSID. The controlled access to Wi-Fi networks operated by businesses described herein can utilize various aspects of the zones and configuration for home Wi-Fi networks, but in the context of business Wi-Fi networks. One difference can be the use of separate SSIDs for the different zones as this increases security.

In an embodiment, the systems and methods can be implemented in a distributed Wi-Fi system such as a multiple access point system, a mesh system, an access point and repeater(s) system, etc. Additionally, the systems and methods provide granular control for all users include traffic limits, time limits, geographic limits, prioritization, self-destructing/terminating, application limits, and combinations thereof. The traffic limits can include setting thresholds for upload/download including absolute traffic, ongoing traffic, etc. The time limits can be used to prevent access at certain times of the day such as at night for children, etc. The geographic limits can be useful in the distributed Wi-Fi system or any other multiple access point system to require access through specific access points, or restriction to the use of particular devices in specific regions of the house, or even access to various devices depending on where the guest is located at the time of desired access. The prioritization can set priorities for different users. The self-destructing/terminating includes setting a time when access ends for a particular user, zone, etc. Finally, the application limits can block certain application use on the Wi-Fi network. An example would be to block video or certain types of Internet gaming, while allowing Web page access in a particular zone.

The password and/or SSID are used by the Wi-Fi network to designate the access level using, for example, OpenFlow rules in an OpenFlow Virtual Switch (OVS). For example, the access level is provided using frame forwarding rules based on Software Defined Networking (SDN) in the OVS. The access points or other devices in the Wi-Fi network are configured as a programmable switch (OVS) and are programmed between devices based on device Media Access Control (MAC) addresses. The OVS can be cloud-controlled where a cloud-based controller configures the rules in a database in each device. The control of the user access can be via an application ("app") on a mobile device or the like that provisions the rules and communicates to the cloud-based controller. In a distributed Wi-Fi network, the access level configuration can explicitly set routing between devices.

The cloud-based controller and associated app can provide log information to the administrator. For example, if a guest user performs actions (or attempts to) in contravention of their access level, this information can be logged. A captive portal can be used to communicate with the guest if they attempt to use services that have not been approved for them. For example, if a user in the Internet Access only zone attempts to access the Wi-Fi lock on the home, he can be redirected to a captive portal Web page that informs the user that he does not have permission to interact with the door lock. Further, the captive portal can provide a mechanism for the guest to request an upgrade in access via the captive portal, e.g., including an explanation or rationale. This would then be communicated to the host of the network, and the host can approve or deny the request. In some circumstances, the captive portal to which the guest is directed upon trying to access barred devices or services could contain advertising or any other information.

The administrator can communicate the password and SSID to guest users in various convenient ways. For example, the password and SSID could be sent to the guest via a text message. On some platforms, the text message can be activated to directly load the SSID and password into the guest's device. However, in some cases this is barred by the operating system. In addition, on some platforms it can be difficult to copy a portion of a text message (the password) separately from other text. In this case, the text message can include a link to a web page. The Web page can include a password that is simpler to copy and paste, or it can include an action to automatically load the password onto the guest's device. The Web page to which the guest is directed to obtain the key and SSID may also have pictorial or written instructions on how to most easily enter the password and SSID into their device. Also, there can be a single click capability which can cause the associated device to associate based on the SSID and password automatically. Since the password sharing is convenient, it can support more complex passwords which are difficult to hack or crack, i.e., long strings of random data. Also, the information via a Web page, a text message, an email, etc. can expire in a certain time period. The Web page itself can be made to exist only temporarily, and its address can be a long, complicated string such that it cannot be discovered by anyone who has not been sent the link.

These methods can also support the delivery of a security certificate. The use of security certificates for gating access to wireless networks is well known in the art. However, the certificates are typically installed manually on each device by a system administrator. In this case, they could be distributed via the Web page process just described, and the certificates might be granted access for only a limited period of time, and as with the passwords, might map the user to a particular access zone or set of devices and services to which they would be allowed access. One convenience of either the password or certificate-based solution is that the guest can be delivered the password or certificate beforehand, before they come to the home. This delivery can be made by email, text message, or via a link to a Web page provided to the guest ahead of time. This allows the guest to pre-install the password or certificate, and can begin using the network immediately upon arrival, with all the correct permissions associated with that guest's intended zone.

Further, based on the cloud-based controller, the service supporting user access level control is running in the cloud and not local to a Wi-Fi network. That is, the cloud-based controller can manage multiple Wi-Fi networks concurrently. Thus, an owner can manage different locations from the same application interface, e.g., multiple homes, etc. For example, if an owner has a network in both their primary residence and a vacation residence, the guest access they provide to a given guest can immediately be applied to the networks in both their primary and vacation homes. Similarly, configurations of access zones can be copied across multiple locations. If the owner sets up an internet only zone, a no video zone, a no game zone, etc., these exact same zones can be created at both their primary residence and their vacation home. Also, the cloud-based controller allows the administrator to provide guest access remotely, move passwords between zones/permissions, etc. For example, while at work, if a visitor to the vacation home requests guest access, the owner can grant that using their application interface over the internet. If such guest had previously visited their primary home and received a password for that location, the password from the primary home could be moved to the vacation home such that the guest's already existing password will work in the vacation home. Another use of the cloud-based access controller is to populate any extensions to a Wi-Fi network with the same access rules. For example, if the owner adds several new access points 14 to the distributed Wi-Fi system 10, the guest access rules can be automatically added to these access points 14 from the cloud 12 without the owner having to configure each of the access points 14 individually.

There is a convenient control for the administrator to change zones for devices, provide access on a room-by-room basis, etc. For example, devices and resources on the Wi-Fi network can be based on where the user device is located, i.e., in the same room. Access levels can also be adjusted depending on the location of the guest. For example, if the guest is in the living room, they might be granted access to the Internet, and to the set top box by the television. If they are in the office, they might be granted access only to the Internet and a printer within the office. If they are in the bedroom, no access to the network at all might be enforced. Of course, various embodiments are contemplated.

Distributed Wi-Fi System

FIG. 1 is a network diagram of a distributed Wi-Fi system 10 with cloud-based 12 control. The distributed Wi-Fi system 10 can operate in accordance with the IEEE 802.11 protocols and variations thereof. The distributed Wi-Fi system 10 includes a plurality of access points 14 (labeled as access points 14A-14H) which can be distributed throughout a location, such as a residence, office, or the like. That is, the distributed Wi-Fi system 10 contemplates operation in any physical location where it is inefficient or impractical to service with a single access point, repeaters, or a mesh system. As described herein, the distributed Wi-Fi system 10 can be referred to as a network, a system, a Wi-Fi network, a Wi-Fi system, a cloud-based system, etc. The access points 14 can be referred to as nodes, access points, Wi-Fi nodes, Wi-Fi access points, etc. The objective of the access points 14 is to provide network connectivity to Wi-Fi client devices 16 (labeled as Wi-Fi client devices 16A-16E). The Wi-Fi client devices 16 can be referred to as client devices, user devices, clients, Wi-Fi clients, Wi-Fi devices, etc.

In a typical residential deployment, the distributed Wi-Fi system 10 can include between 3 to 12 access points or more in a home. A large number of access points 14 (which can also be referred to as nodes in the distributed Wi-Fi system 10) ensures that the distance between any access point 14 is always small, as is the distance to any Wi-Fi client device 16 needing Wi-Fi service. That is, an objective of the distributed Wi-Fi system 10 is for distances between the access points 14 to be of similar size as distances between the Wi-Fi client devices 16 and the associated access point 14. Such small distances ensure that every corner of a consumer's home is well covered by Wi-Fi signals. It also ensures that any given hop in the distributed Wi-Fi system 10 is short and goes through few walls. This results in very strong signal strengths for each hop in the distributed Wi-Fi system 10, allowing the use of high data rates, and providing robust operation. Note, those skilled in the art will recognize the Wi-Fi client devices 16 can be mobile devices, tablets, computers, consumer electronics, home entertainment devices, televisions, or any network-enabled device. For external network connectivity, one or more of the access points 14 can be connected to a modem/router 18 which can be a cable modem, Digital Subscriber Loop (DSL) modem, or any device providing external network connectivity to the physical location associated with the distributed Wi-Fi system 10.

While providing excellent coverage, a large number of access points 14 (nodes) presents a coordination problem. Getting all the access points 14 configured correctly and communicating efficiently requires centralized control. This control is preferably done on servers 20 that can be reached across the Internet (the cloud 12) and accessed remotely such as through an application ("app") running on a user device 22. The running of the distributed Wi-Fi system 10, therefore, becomes what is commonly known as a "cloud service." The servers 20 can be a cloud-based controller configured to receive measurement data, to analyze the measurement data, and to configure the access points 14 in the distributed Wi-Fi system 10 based thereon, through the cloud 12. The servers 20 can also be configured to determine which access point 14 each of the Wi-Fi client devices 16 connect (associate) with. That is, in an aspect, the distributed Wi-Fi system 10 includes cloud-based control (with a cloud-based controller or cloud service) to optimize, configure, and monitor the operation of the access points 14 and the Wi-Fi client devices 16. This cloud-based control is contrasted with a conventional operation which relies on a local configuration such as by logging in locally to an access point. In the distributed Wi-Fi system 10, the control and optimization does not require local login to the access point 14, but rather the user device 22 (or a local Wi-Fi client device 16) communicating with the servers 20 in the cloud 12, such as via a disparate network (a different network than the distributed Wi-Fi system 10) (e.g., LTE, another Wi-Fi network, etc.).

The access points 14 can include both wireless links and wired links for connectivity. In the example of FIG. 1, the access point 14A has an example gigabit Ethernet (GbE) wired connection to the modem/router 18. Optionally, the access point 14B also has a wired connection to the modem/router 18, such as for redundancy or load balancing. Also, the access points 14A, 14B can have a wireless connection to the modem/router 18. The access points 14 can have wireless links for client connectivity (referred to as a client link) and for backhaul (referred to as a backhaul link). The distributed Wi-Fi system 10 differs from a conventional Wi-Fi mesh network in that the client links and the backhaul links do not necessarily share the same Wi-Fi channel, thereby reducing interference. That is, the access points 14 can support at least two Wi-Fi wireless channels—which can be used flexibly to serve either the client link or the backhaul link and may have at least one wired port for connectivity to the modem/router 18, or for connection to other devices. In the distributed Wi-Fi system 10, only a small subset of the access points 14 require direct connectivity to the modem/router 18 with the non-connected access points 14 communicating with the modem/router 18 through the backhaul links back to the connected access points 14.

Distributed Wi-Fi System Compared to Conventional Wi-Fi Systems

Figure 2:
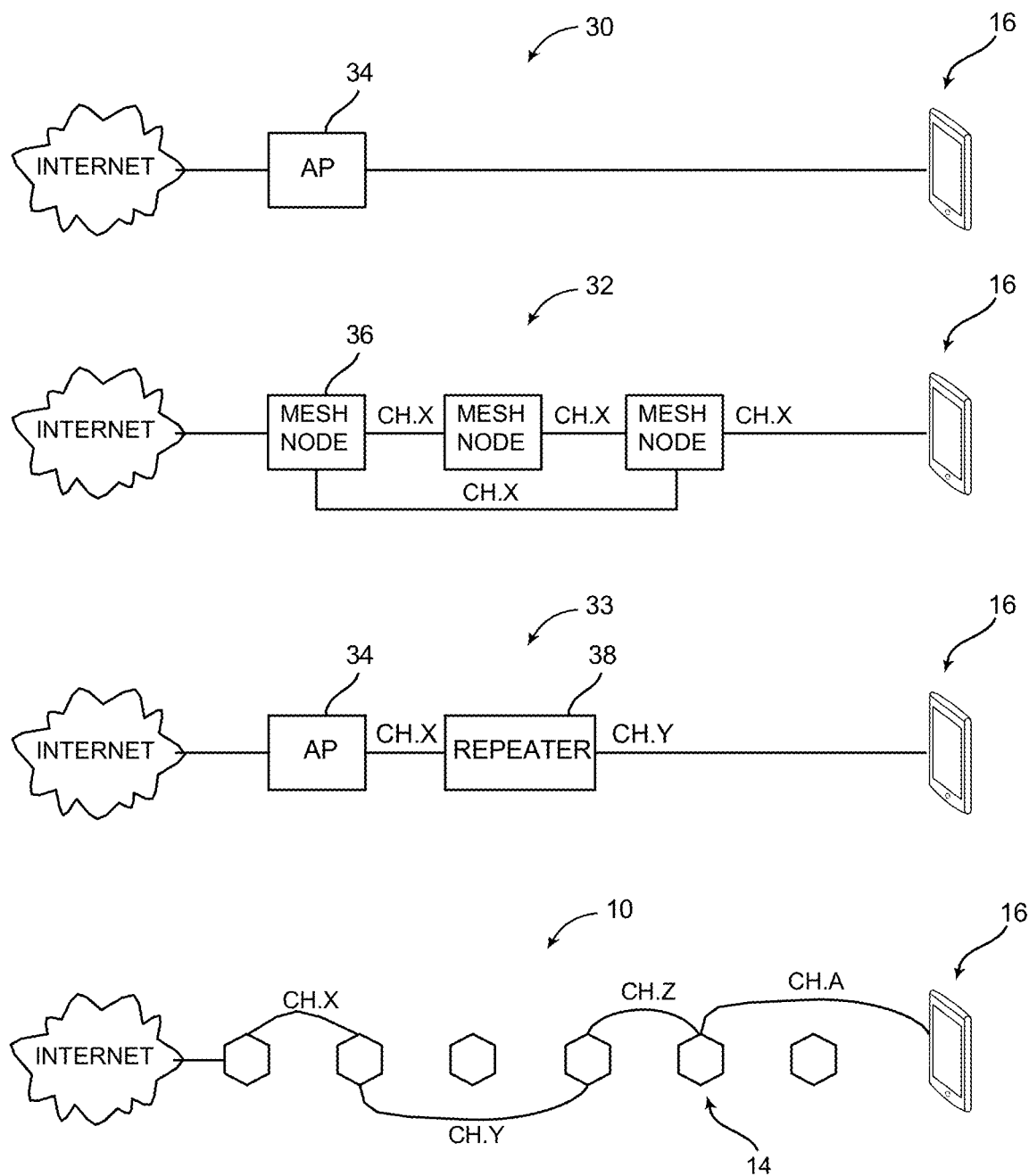
FIG. 2 is a network diagram of differences in operation of the distributed Wi-Fi system of FIG. 1 relative to a conventional single access point system, a Wi-Fi mesh network, and a Wi-Fi repeater system.

FIG. 2 is a network diagram of differences in operation of the distributed Wi-Fi system 10 relative to a conventional single access point system 30, a Wi-Fi mesh network 32, and a Wi-Fi repeater network 33. The single access point system 30 relies on a single, high-powered access point 34 which may be centrally located to serve all Wi-Fi client devices 16 in a location (e.g., house). Again, as described herein, in a typical residence, the single access point system 30 can have several walls, floors, etc. between the access point 34 and the Wi-Fi client devices 16. Plus, the single access point system 30 operates on a single channel, leading to potential interference from neighboring systems. The Wi-Fi mesh network 32 solves some of the issues with the single access point system 30 by having multiple mesh nodes 36 which distribute the Wi-Fi coverage. Specifically, the Wi-Fi mesh network 32 operates based on the mesh nodes 36 being fully interconnected with one another, sharing a channel such as a channel X between each of the mesh nodes 36 and the Wi-Fi client device 16. That is, the Wi-Fi mesh network 32 is a fully interconnected grid, sharing the same channel, and allowing multiple different paths between the mesh nodes 36 and the Wi-Fi client device 16. However, since the Wi-Fi mesh network 32 uses the same backhaul channel, every hop between source points divides the network capacity by the number of hops taken to deliver the data. For example, if it takes three hops to stream a video to a Wi-Fi client device 16, the Wi-Fi mesh network 32 is left with only ⅓ the capacity. The Wi-Fi repeater network 33 includes the access point 34 coupled wirelessly to a Wi-Fi repeater 38. The Wi-Fi repeater network 33 is a star topology where there is at most one Wi-Fi repeater 38 between the access point 14 and the Wi-Fi client device 16. From a channel perspective, the access point 34 can communicate to the Wi-Fi repeater 38 on a first channel, Ch. X, and the Wi-Fi repeater 38 can communicate to the Wi-Fi client device 16 on a second channel, Ch. Y.

The distributed Wi-Fi system 10 solves the problem with the Wi-Fi mesh network 32 of requiring the same channel for all connections by using a different channel or band for the various hops (note, some hops may use the same channel/band, but it is not required), to prevent slowing down the Wi-Fi speed. For example, the distributed Wi-Fi system 10 can use different channels/bands between access points 14 and between the Wi-Fi client device 16 (e.g., Ch. X, Y, Z, A), and, also, the distributed Wi-Fi system 10 does not necessarily use every access point 14, based on configuration and optimization by the cloud 12. The distributed Wi-Fi system 10 solves the problems of the single access point system 30 by providing multiple access points 14. The distributed Wi-Fi system 10 is not constrained to a star topology as in the Wi-Fi repeater network 33 which at most allows two wireless hops between the Wi-Fi client device 16 and a gateway. Also, the distributed Wi-Fi system 10 forms a tree topology where there is one path between the Wi-Fi client device 16 and the gateway, but which allows for multiple wireless hops unlike the Wi-Fi repeater network 33.

Wi-Fi is a shared, simplex protocol meaning only one conversation between two devices can occur in the network at any given time, and if one device is talking the others need to be listening. By using different Wi-Fi channels, multiple simultaneous conversations can happen simultaneously in the distributed Wi-Fi system 10. By selecting different Wi-Fi channels between the access points 14, interference and congestion are avoided. The server 20 through the cloud 12 automatically configures the access points 14 in an optimized channel hop solution. The distributed Wi-Fi system 10 can choose routes and channels to support the ever-changing needs of consumers and their Wi-Fi client devices 16. The distributed Wi-Fi system 10 approach is to ensure Wi-Fi signals do not need to travel far—either for backhaul or client connectivity. Accordingly, the Wi-Fi signals remain strong and avoid interference by communicating on the same channel as in the Wi-Fi mesh network 32 or with Wi-Fi repeaters. In an aspect, the servers 20 in the cloud 12 are configured to optimize channel selection for the best user experience.

Of note, the systems and methods described herein contemplate operation through any of the distributed Wi-Fi system 10, the single access point system 30, the Wi-Fi mesh network 32, and the Wi-Fi repeater network 33. There are certain aspects of the systems and methods which require multiple device Wi-Fi networks, such as the distributed Wi-Fi system 10, the Wi-Fi mesh network 32, and the Wi-Fi repeater network.

Also, the distributed Wi-Fi system 10, the single access point system 30, the Wi-Fi mesh network 32, and the Wi-Fi repeater network 33 can be deployed in a business location, e.g., store, office, warehouse, manufacturing facility, restaurant, hotel, and the like. That is, while the previous description described the distributed Wi-Fi system 10 as being deployed in a residence, the same hardware, cloud controller, etc. can be used in a business setting.

Access Point

Figure 3:
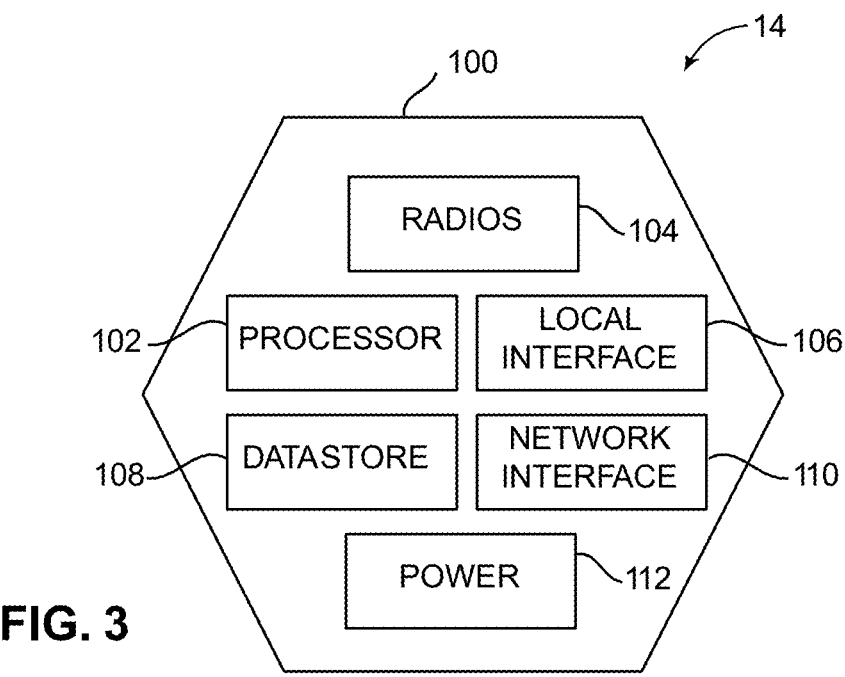
FIG. 3 is a block diagram of functional components of the access point in the distributed Wi-Fi system of FIG. 1.

FIG. 3 is a block diagram of functional components of the access point 14 in the distributed Wi-Fi system 10. The access point 14 includes a physical form factor 100 which contains a processor 102, a plurality of radios 104, a local interface 106, a data store 108, a network interface 110, and power 112. It should be appreciated by those of ordinary skill in the art that FIG. 3 depicts the access point 14 in an oversimplified manner, and a practical embodiment may include additional components and suitably configured processing logic to support features described herein or known or conventional operating features that are not described in detail herein.

In an embodiment, the form factor 100 is a compact physical implementation where the access point 14 directly plugs into an electrical socket and is physically supported by the electrical plug connected to the electrical socket. This compact physical implementation is ideal for a large number of access points 14 distributed throughout a residence. The processor 102 is a hardware device for executing software instructions. The processor 102 can be any custom made or commercially available processor, a Central Processing Unit (CPU), an auxiliary processor among several processors associated with the mobile device 300, a semiconductor-based microprocessor (in the form of a microchip or chip set), or generally any device for executing software instructions. When the access point 14 is in operation, the processor 102 is configured to execute software stored within memory or the data store 108, to communicate data to and from the memory or the data store 108, and to generally control operations of the access point 14 pursuant to the software instructions. In an embodiment, the processor 102 may include a mobile-optimized processor such as optimized for power consumption and mobile applications.

The radios 104 enable wireless communication in the distributed Wi-Fi system 10. The radios 104 can operate according to the IEEE 802.11 standard. The radios 104 include address, control, and/or data connections to enable appropriate communications on the distributed Wi-Fi system 10. As described herein, the access point 14 includes a plurality of radios to support different links, i.e., backhaul links and client links. The optimization 70 determines the configuration of the radios 104 such as bandwidth, channels, topology, etc. In an embodiment, the access points 14 support dual-band operation simultaneously operating 2.4 GHz and 5 GHz 2×2 MIMO 802.11b/g/n/ac radios having operating bandwidths of 20/40 MHz for 2.4 GHz and 20/40/80 MHz for 5 GHz. For example, the access points 14 can support IEEE 802.11AC1200 gigabit Wi-Fi (300+867 Mbps).

The local interface 106 is configured for local communication to the access point 14 and can be either a wired connection or wireless connection such as Bluetooth or the like. Since the access points 14 are configured via the cloud 12, an onboarding process is required to first establish connectivity for a newly turned on access point 14. In an embodiment, the access points 14 can also include the local interface 106 allowing connectivity to the user device 22 (or a Wi-Fi client device 16) for onboarding to the distributed Wi-Fi system 10 such as through an app on the user device 22. The data store 108 is used to store data. The data store 108 may include any of volatile memory elements (e.g., random access memory (RAM, such as DRAM, SRAM, SDRAM, and the like)), nonvolatile memory elements (e.g., ROM, hard drive, tape, CDROM, and the like), and combinations thereof. Moreover, the data store 108 may incorporate electronic, magnetic, optical, and/or other types of storage media.

The network interface 110 provides wired connectivity to the access point 14. The network interface 104 may be used to enable the access point 14 communicate to the modem/router 18. Also, the network interface 104 can be used to provide local connectivity to a Wi-Fi client device 16 or user device 22. For example, wiring in a device to an access point 14 can provide network access to a device which does not support Wi-Fi. In an embodiment, all of the access points 14 in the distributed Wi-Fi system 10 include the network interface 110. In another embodiment, select access points 14 which connect to the modem/router 18 or require local wired connections have the network interface 110. The network interface 110 may include, for example, an Ethernet card or adapter (e.g., 10BaseT, Fast Ethernet, Gigabit Ethernet, 10 GbE). The network interface 110 may include address, control, and/or data connections to enable appropriate communications on the network.

The processor 102 and the data store 108 can include software and/or firmware which essentially controls the operation of the access point 14, data gathering and measurement control, data management, memory management, and communication and control interfaces with the server 20 via the cloud. The processor 102 and the data store 108 may be configured to implement the various processes, algorithms, methods, techniques, etc. described herein.

Cloud Server and User Device

Figure 4:
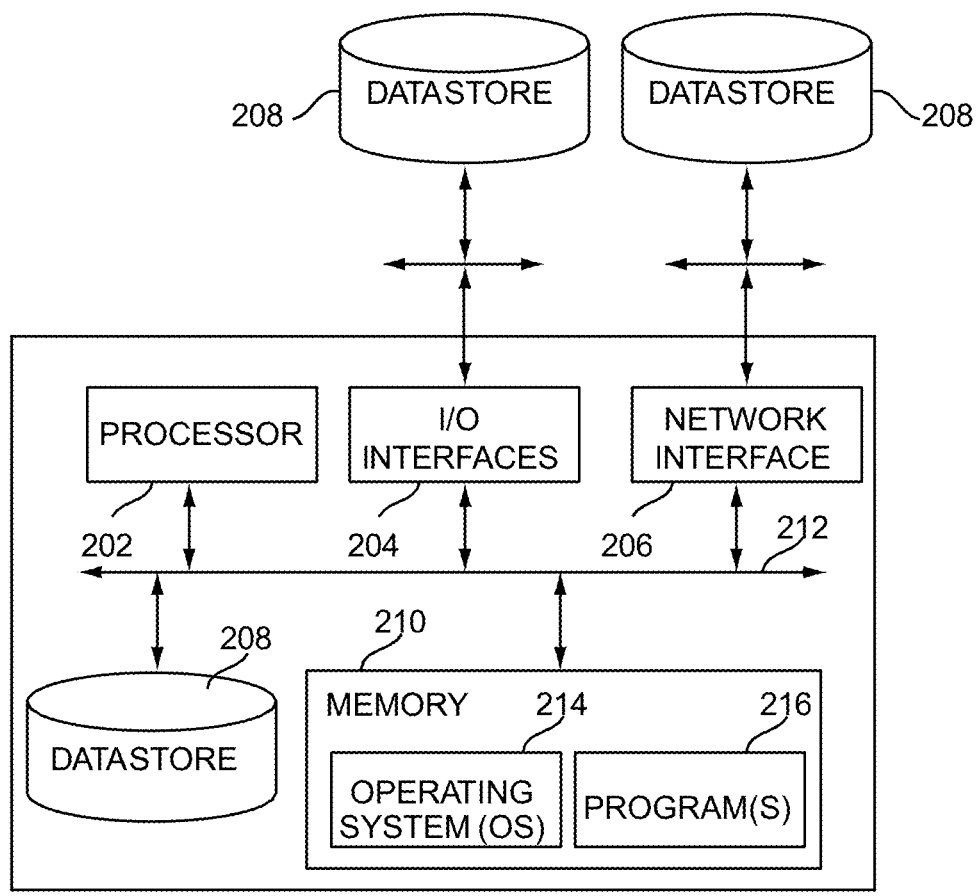
FIG. 4 is a block diagram of functional components of a server, a Wi-Fi client device, or a user device which may be used with the distributed Wi-Fi system of FIG. 1.

FIG. 4 is a block diagram of functional components of the server 20, the Wi-Fi client device 16, or the user device 22 which may be used with the distributed Wi-Fi system 10. FIG. 4 illustrates functional components which can form any of the Wi-Fi client device 16, the server 20, the user device 22, or any general processing device. The server 20 may be a digital computer that, in terms of hardware architecture, generally includes a processor 202, input/output (I/O) interfaces 204, a network interface 206, a data store 208, and memory 210. It should be appreciated by those of ordinary skill in the art that FIG. 4 depicts the server 20 in an oversimplified manner, and a practical embodiment may include additional components and suitably configured processing logic to support features described herein or known or conventional operating features that are not described in detail herein.

The components (202, 204, 206, 208, and 210) are communicatively coupled via a local interface 212. The local interface 212 may be, for example, but not limited to, one or more buses or other wired or wireless connections, as is known in the art. The local interface 212 may have additional elements, which are omitted for simplicity, such as controllers, buffers (caches), drivers, repeaters, and receivers, among many others, to enable communications. Further, the local interface 212 may include address, control, and/or data connections to enable appropriate communications among the aforementioned components.

The processor 202 is a hardware device for executing software instructions. The processor 202 may be any custom made or commercially available processor, a central processing unit (CPU), an auxiliary processor among several processors associated with the server 20, a semiconductor-based microprocessor (in the form of a microchip or chip set), or generally any device for executing software instructions. When the server 20 is in operation, the processor 202 is configured to execute software stored within the memory 210, to communicate data to and from the memory 210, and to generally control operations of the server 20 pursuant to the software instructions. The I/O interfaces 204 may be used to receive user input from and/or for providing system output to one or more devices or components. User input may be provided via, for example, a keyboard, touchpad, and/or a mouse. System output may be provided via a display device and a printer (not shown). I/O interfaces 204 may include, for example, a serial port, a parallel port, a small computer system interface (SCSI), a serial ATA (SATA), a fibre channel, Infiniband, iSCSI, a PCI Express interface (PCI-x), an infrared (IR) interface, a radio frequency (RF) interface, and/or a universal serial bus (USB) interface.

The network interface 206 may be used to enable the server 20 to communicate on a network, such as the cloud 12. The network interface 206 may include, for example, an Ethernet card or adapter (e.g., 10BaseT, Fast Ethernet, Gigabit Ethernet, 10 GbE) or a wireless local area network (WLAN) card or adapter (e.g., 802.11a/b/g/n/ac). The network interface 206 may include address, control, and/or data connections to enable appropriate communications on the network. A data store 208 may be used to store data. The data store 208 may include any of volatile memory elements (e.g., random access memory (RAM, such as DRAM, SRAM, SDRAM, and the like)), nonvolatile memory elements (e.g., ROM, hard drive, tape, CDROM, and the like), and combinations thereof. Moreover, the data store 208 may incorporate electronic, magnetic, optical, and/or other types of storage media. In one example, the data store 208 may be located internal to the server 20 such as, for example, an internal hard drive connected to the local interface 212 in the server 20. Additionally, in another embodiment, the data store 208 may be located external to the server 20 such as, for example, an external hard drive connected to the I/O interfaces 204 (e.g., SCSI or USB connection). In a further embodiment, the data store 208 may be connected to the server 20 through a network, such as, for example, a network attached file server.

The memory 210 may include any of volatile memory elements (e.g., random access memory (RAM, such as DRAM, SRAM, SDRAM, etc.)), nonvolatile memory elements (e.g., ROM, hard drive, tape, CDROM, etc.), and combinations thereof. Moreover, the memory 210 may incorporate electronic, magnetic, optical, and/or other types of storage media. Note that the memory 210 may have a distributed architecture, where various components are situated remotely from one another but can be accessed by the processor 202. The software in memory 210 may include one or more software programs, each of which includes an ordered listing of executable instructions for implementing logical functions. The software in the memory 210 includes a suitable operating system (O/S) 214 and one or more programs 216. The operating system 214 essentially controls the execution of other computer programs, such as the one or more programs 216, and provides scheduling, input-output control, file and data management, memory management, and communication control and related services. The one or more programs 216 may be configured to implement the various processes, algorithms, methods, techniques, etc. described herein, such as related to the optimization 70.

Non-Host Access (NHA)

Again, in various embodiments, the systems and methods provide controlled guest access to Wi-Fi networks. As described herein, the controlled guest access can be referred to as Non-host Access (NHA), i.e., a host has full accessibility to the Wi-Fi network and associated devices and resources whereas a non-host is a guest with limited access. Instead of creating a separate "guest SSID," a single SSID is used at each location, a number of access zones are created to manage access privileges of connecting devices. Each access zone is accessible using a unique set of keys (i.e., Wi-Fi passwords), any of which can be used to access the SSID. There is no technical upper limit on the number of keys that can be assigned to each Zone, but to keep this manageable, a maximum limit can be set 10. access zone The key used to access the SSID determines the access zone for the connecting Device. Specifically, a device is automatically a part of an access zone to which it is connected, and if a device has been given multiple passwords, then its zone is determined by which password it most recently used to connect.

In an embodiment, three access zones can be defined for each location.

1) Home access zone—when a new client uses the Home Key, it gets automatically included in the list of Home devices and thereby can access other devices within the Home and be accessed from other devices within the Home. The Home access zone provides access to the Internet and to all devices connected to the Wi-Fi network as well as automatic access to new devices that join the network. Note, the original SSID/Key entered for the Wi-Fi network can by default be the Home access zone.

2) Guests access zone—when a new client uses a Guest Key, it can access the Internet and automatically gets included in a list of Guest devices and can access and be accessed from other devices in this Group. The Guest access zone would include devices in the home which the owner wishes to share with guests, such as a printer, but would not include devices that the owner does not wish to share, like a Wi-Fi door lock, etc. New devices added to the Home access zone are not made available to this Guest access zone until provisioned by the host.

3) Internet access Only access zone—clients in this group can only connect to the Internet and cannot access each other, or any other device within the home.

The following table shows the relationship between devices in each access zone. For example, Guests connected devices on different passwords may see each other, but they only have permission to see certain devices on the Home access zone controlled by the user. Devices connected to the Internet Only network are completely blocked from anything other than Internet access.

|  | Home | Guests | Internet Only |
| --- | --- | --- | --- |
| "Home Network" Devices | Open | Permission Based | Blocked |
| Access zone Devices password 1 | Open | Open | Blocked |
| Access zone Devices password 2 | Open | Open | Blocked |
| Access zone Devices password n | Open | Open | Blocked |

There is theoretically no limit to the number of access zones that can be created with different sets of permissions for devices within the home. The concept extends all the way to having a unique access zone per key, which is equivalently the ability to specify a unique set of access permissions for each individual guest allowed on the network.

Figure 5:
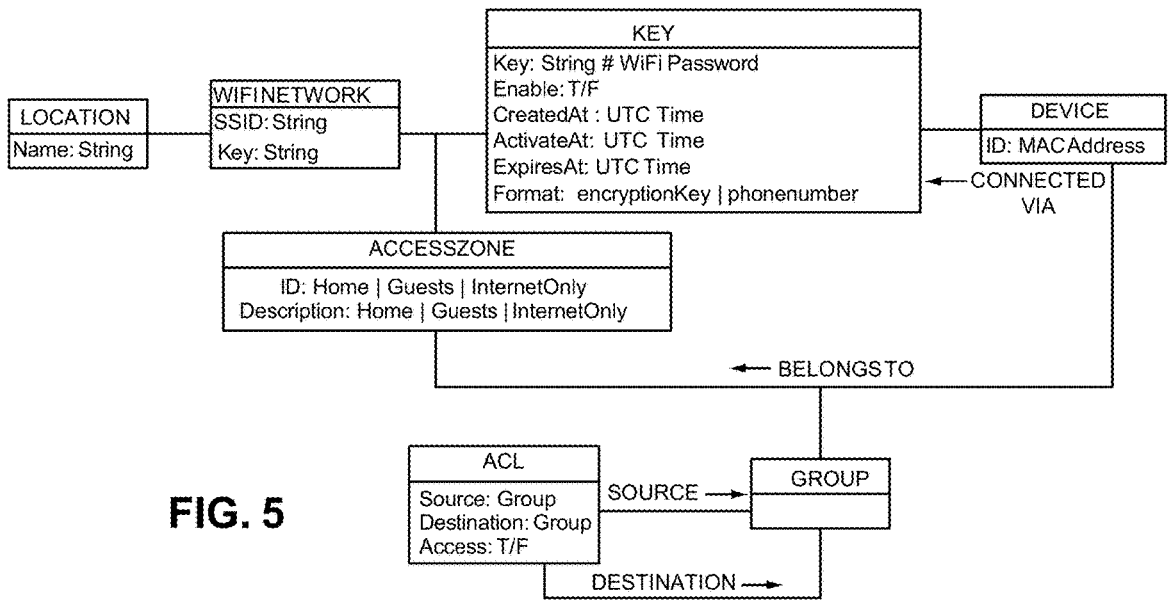
FIGS. 5 and 6 are diagrams of object models with FIG. 5 as business object model and FIG. 6 a logical object model for supporting access zones.
Figure 6:
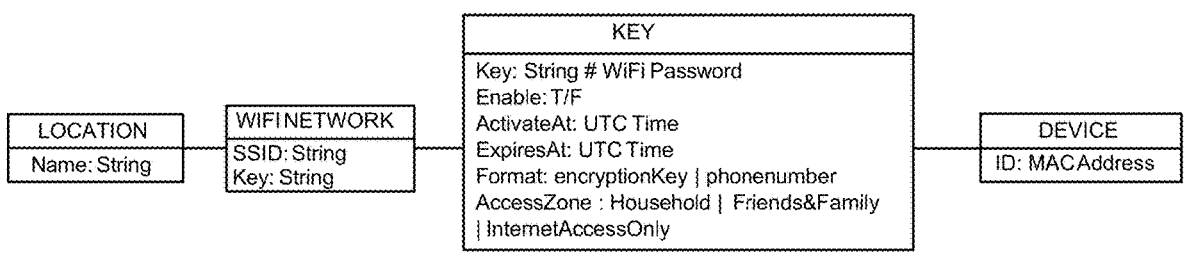

FIGS. 5 and 6 are diagrams of object models with FIG. 5 as a business object model and FIG. 6 a logical object model for supporting access zones. The key is an enumeration (ENUM) of the access zones, e.g., Home, Guests, or InternetAccessOnly. These object models can be hosted/managed by the cloud-based controller. The location is designated by a name which is a string. The Wi-Fi network is designated by the SSID which is a string and the Key which is a string. The Key is the Wi-Fi password, and different Keys are available for each Wi-Fi network. The Keys can be selectively enabled and set for different time activation and/or expiration. The device is designated by a MAC address and belongs to an AccessZone, e.g., Home, Guests, InternetOnly, etc. which is based on the Key. Also, an Access Control List (ACL) can be provided to a group which the device can belong.

Figure 7:
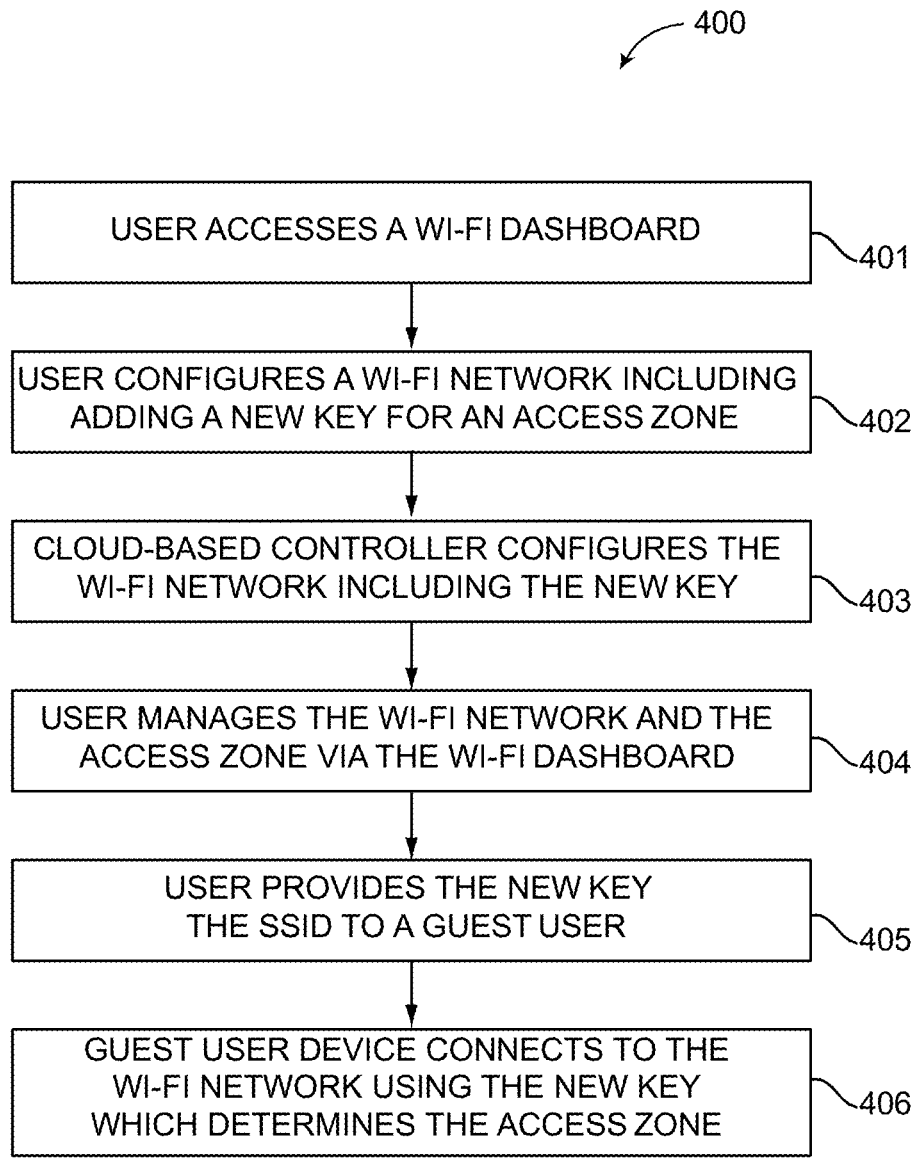
FIG. 7 is a flowchart of a non-host access process.

FIG. 7 is a flowchart of a non-host access process 400. The non-host access process 400 is performed for the Wi-Fi network, e.g., the distributed Wi-Fi system 10, the single access point system 30, the Wi-Fi mesh network 32, and the Wi-Fi repeater network 33, using the cloud-based controller, i.e., the cloud 12 and the servers 20, the user device 22, and one or more guest user devices, i.e., the Wi-Fi client devices 16. The user accesses a Wi-Fi dashboard. (step 401). Here, the Wi-Fi network is managed/controlled by the cloud-based controller which can operate the Wi-Fi dashboard. The user can access the Wi-Fi dashboard using the user device 22 and an application, Web browser, etc.

Figure 8:
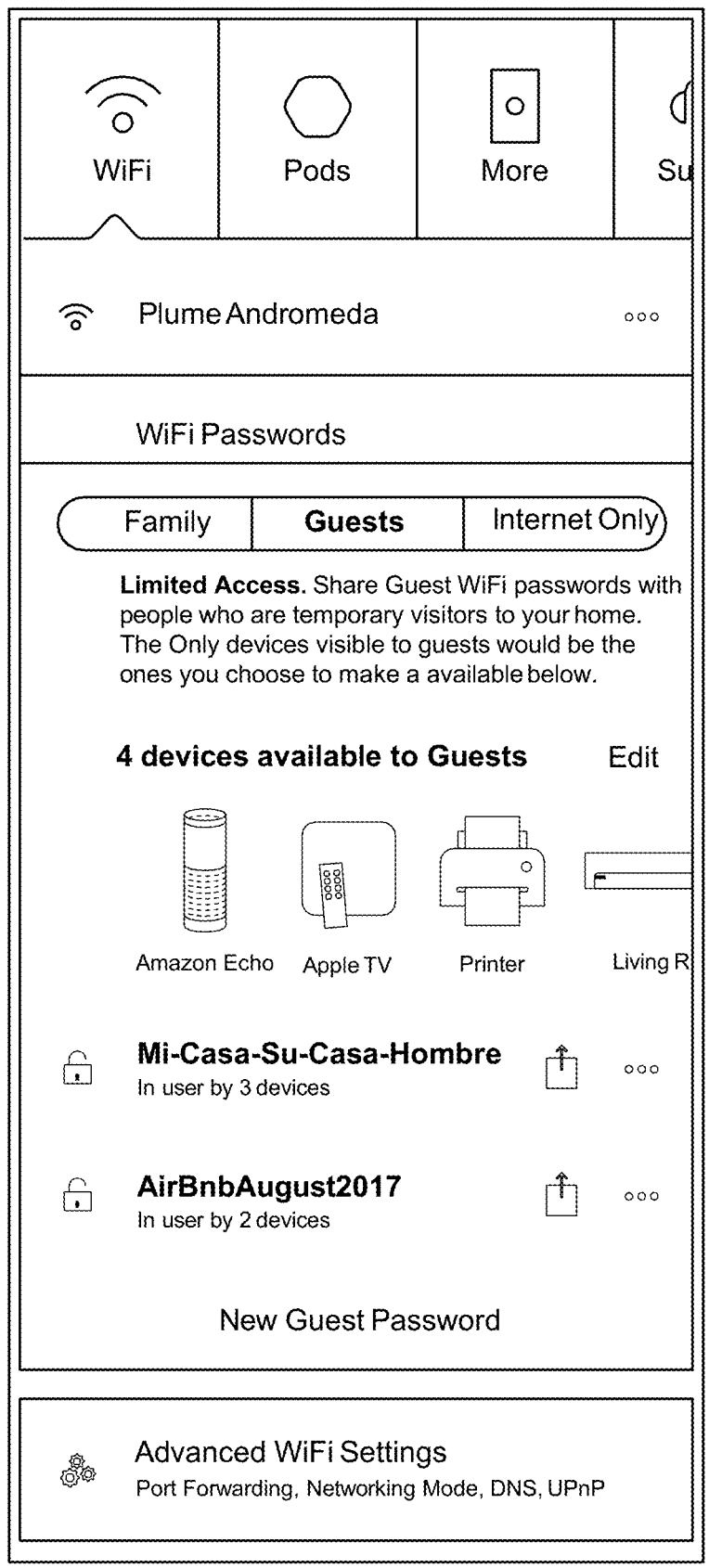
FIG. 8 is a screenshot of a Wi-Fi Dashboard.

FIG. 8 is a screenshot of the Wi-Fi Dashboard. The owner is an administrator for the Wi-Fi network. The owner can click on the Wi-Fi tab in FIG. 8, and the Wi-Fi Dashboard is displayed. The owner can view various access zones, keys defined in each zone, number of devices connected using each key.

Figure 9:
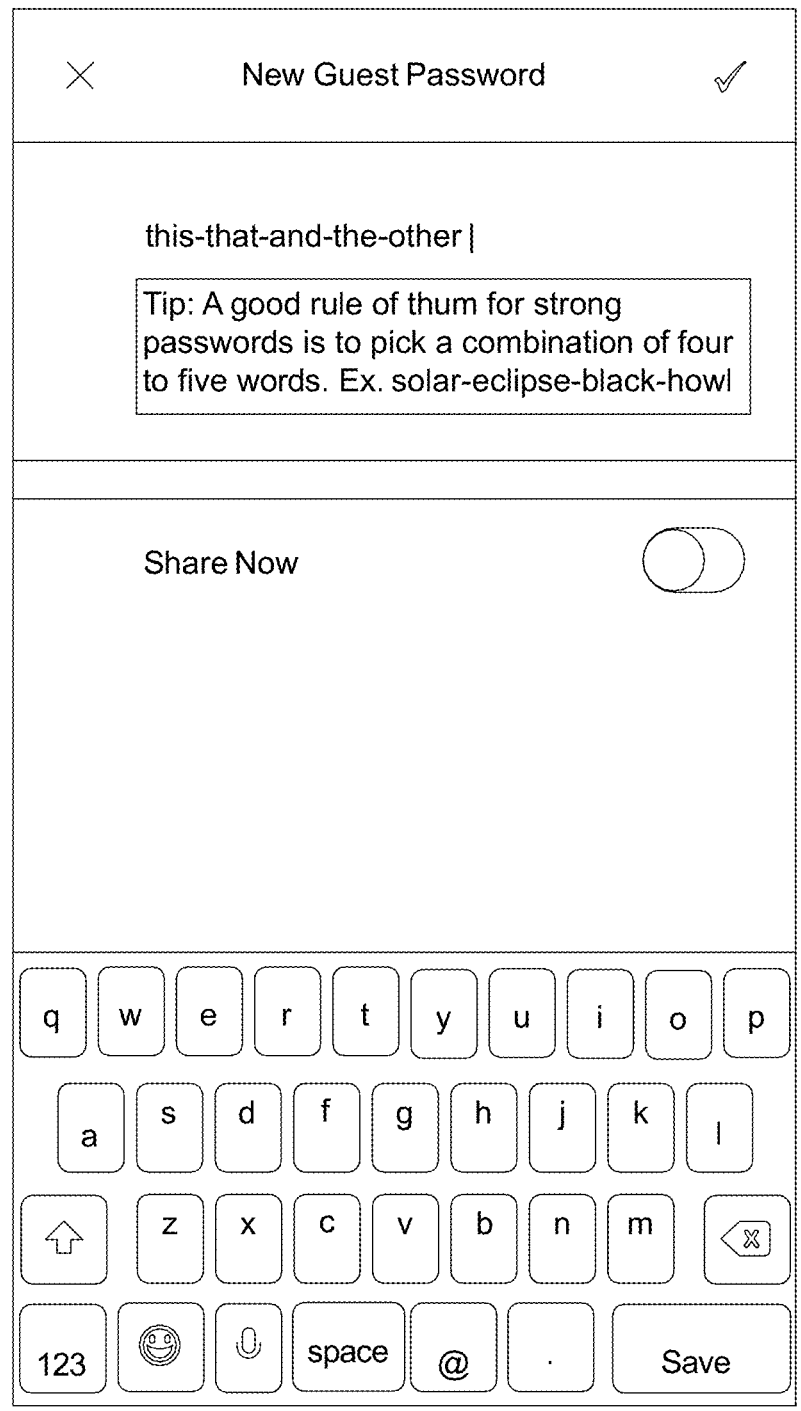
FIG. 9 is a screenshot for setting a new guest password.

Next, in FIG. 7, owner configured the Wi-Fi network including adding a new key for an access zone (step 402). For example, in FIG. 8, the owner can select NEW GUEST PASSWORD to bring up a screen illustrated in FIG. 9 for setting a new guest password. The mobile app on the user device 22 is used to set the new guest password (or multiple guest passwords). The guest password is a key as described herein and these keys are provided to the cloud-based controller. For example, the owner can publish one or more keys to the cloud-based controller which in turn maintains these in data structures (such as in the object models) and updates the device software in the Wi-Fi network, such as using the Open vSwitch Database Management Protocol (OVSDB).

Back in FIG. 7, the cloud-based controller configures the Wi-Fi network including the new key (step 403). Specifically, the cloud-based controller can communicate and initialize the Wi-Fi network upon startup including providing the SSID, keys, and configuration information. For purposes of the access zones, the cloud-based controller can update OVSDB Virtual Interface (VIF) tables for each node in the Wi-Fi network. The OVSDB VIF table can include a security column used to create multiple encryption keys for the same SSID.

Figure 10:
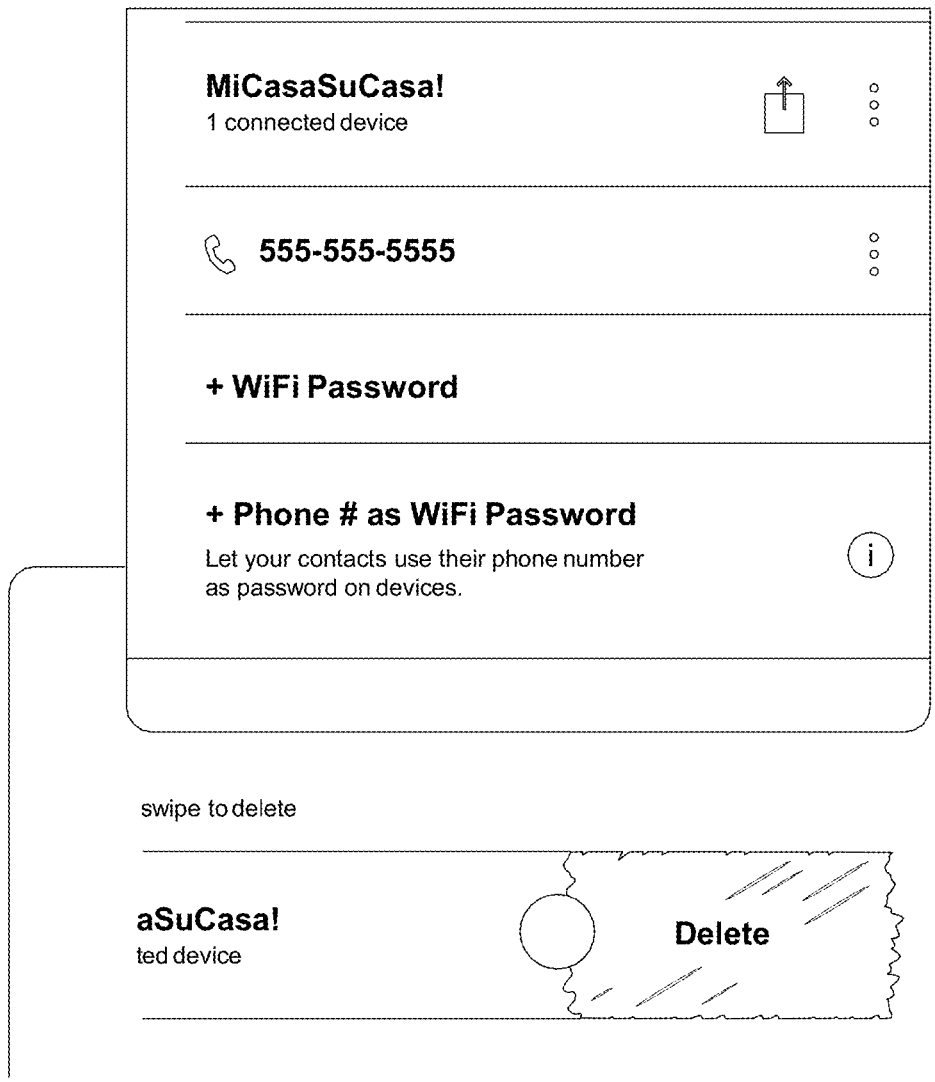
FIG. 10 is a screenshot for deleting a key.
Figure 11:
FIG. 11 is a screenshot for viewing devices for an access zone.
Figure 12:
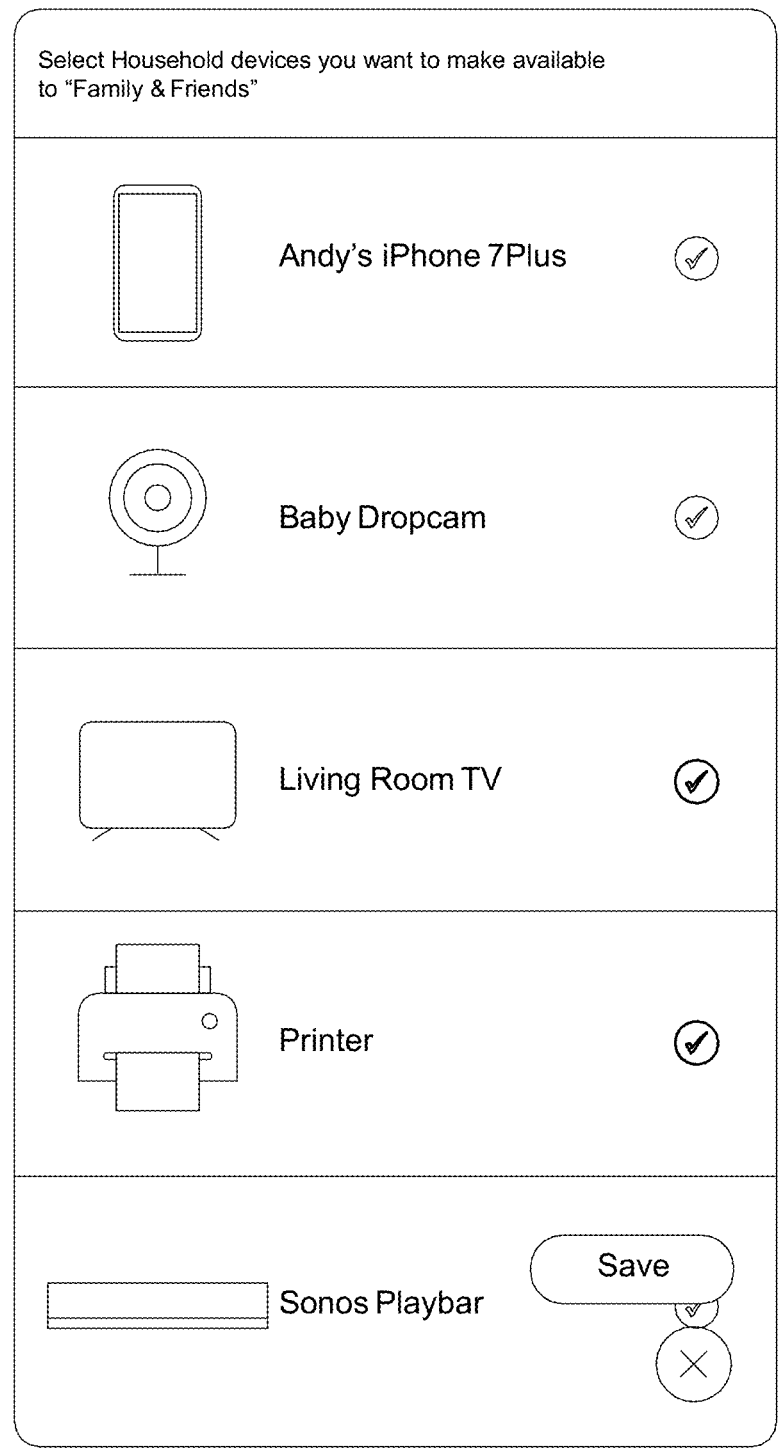
FIG. 12 is a screenshot for selecting devices for an access zone.

The owner manages the Wi-Fi network and the access zone via the Wi-Fi dashboard (step 404). The management can include deleting a key as illustrated in FIG. 10. The management can also include viewing devices for an access zone as illustrated in FIG. 11. For example, FIG. 11 includes three access zones—Household, Friends & Family, and Internet Only and devices can be added/removed selectively. The management can also include selecting devices for an access zone as illustrated in FIG. 12. Here, the user can select which devices are available for the Friends & Family access zone.

Figure 13:
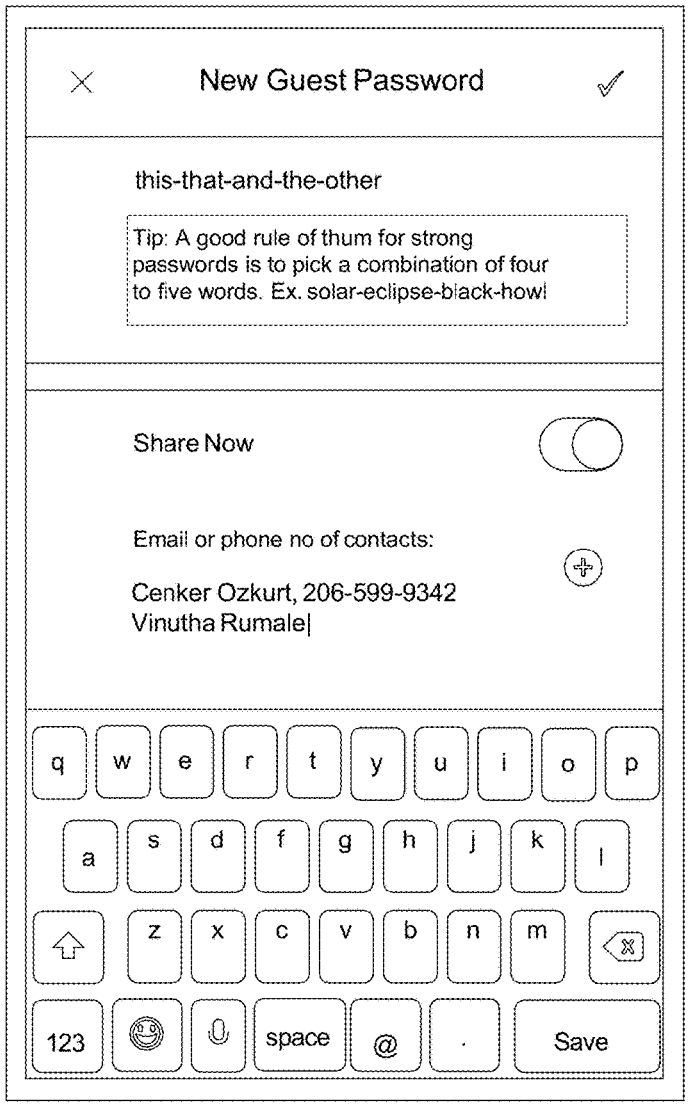
FIG. 13 is a screenshot of the new guest password and sharing thereof.
Figure 14:
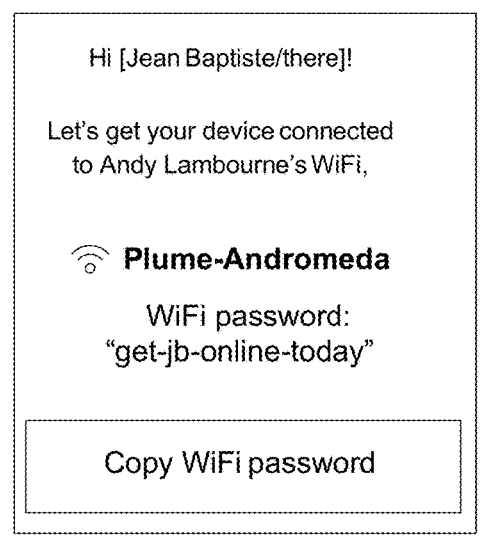
FIG. 14 is a screenshot of the Web page with a link to copy the Key (Wi-Fi password)

Back in FIG. 7, the owner provides the new key and the SSID to a guest user (step 405). FIG. 13 is a screenshot of the new guest password and sharing thereof. For example, the user device 22 can create an "invitation to join" which can be a shareable Uniform Resource Locator (URL) that points to a secure Web page containing the SSID and access zone Key for the guest user to login with. The Web page can expire after a relatively short time period. FIG. 14 is a screenshot of the Web page with a link to copy the Key (Wi-Fi password). Other embodiments are also contemplated such as a text, email, etc. Also, the Key and SSID can be automatically configured by the guest user.

Back in FIG. 7, the guest user device connects to the Wi-Fi network using the new key which determines the access zone of the guest user device (step 406). The Wi-Fi network devices have an OVSDB Wifi Associated Clients table with the Key used by the guest user device while connecting to the SSID. This table is maintained and shared with the cloud-based controller.

Single SSID, Multiple Password Onboarding—Client Initiated

Figure 15B:
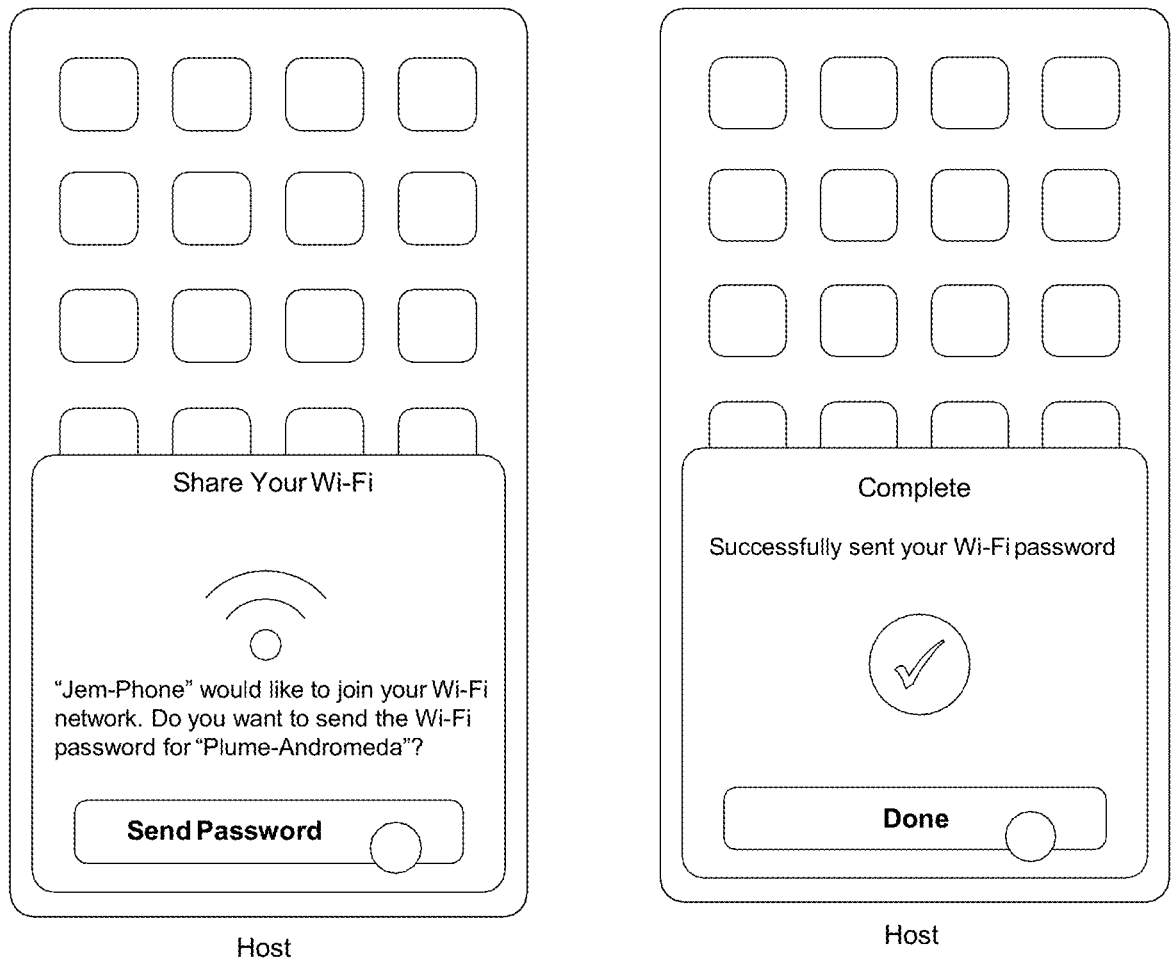
Figure 15C:
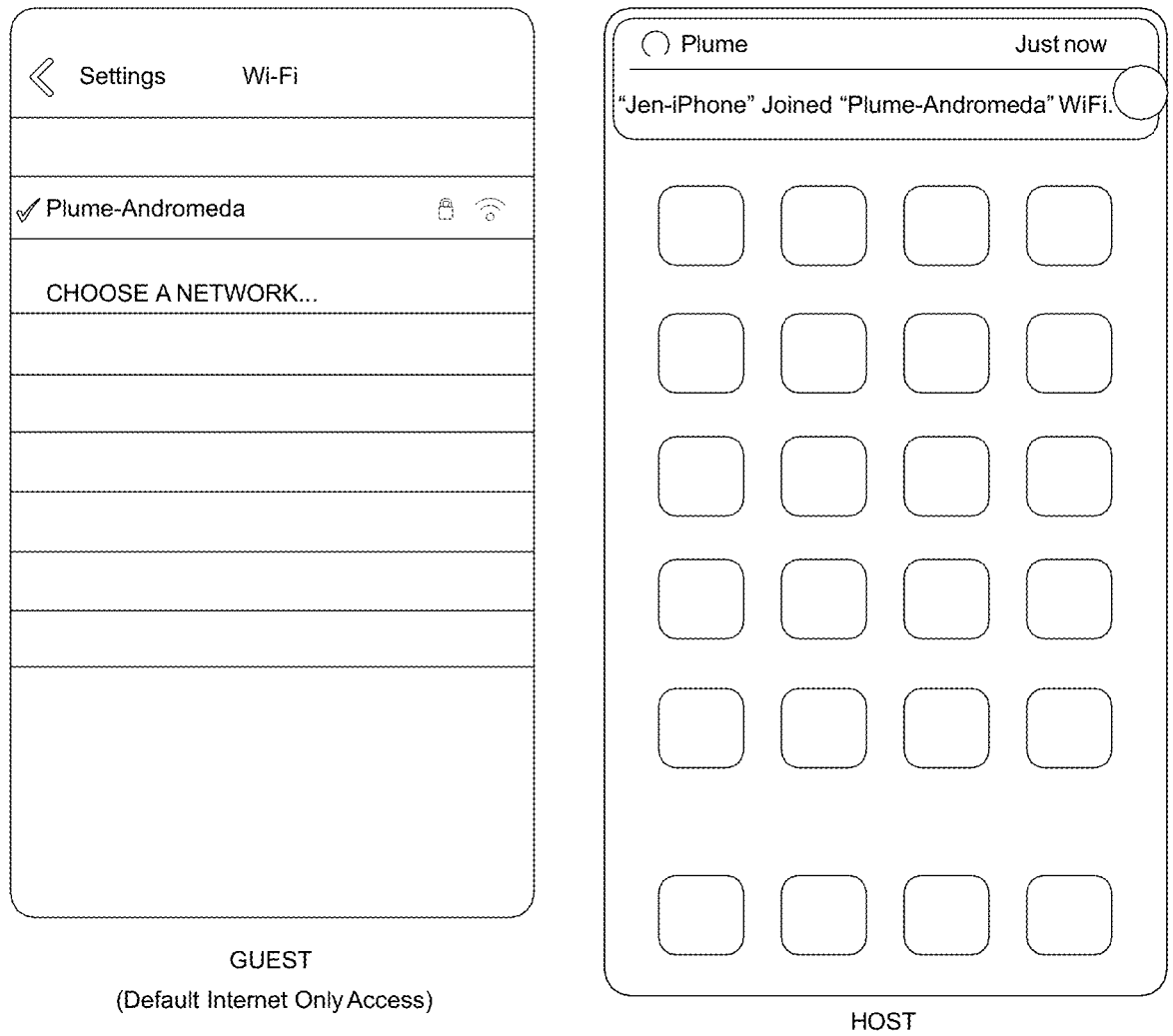

FIGS. 15A-15C are a series of screenshots illustrating a single SSID, multiple password (key) onboarding initiated by the guest client. The screenshots are performed through an app on the user device 22 (host) and a corresponding guest Wi-Fi device 16 (guest). The guest first connects to the Wi-Fi network (SSID Plume-Andromeda) and is presented with a screen to enter the password (key). The key can be the guest's phone number, email address, or some other unique information. Alternatively, the key can be provided, e.g., "friends." The host can send the password responsive to a notification that Jens-Phone (guest) wants to access the Wi-Fi network. The guest access the Wi-Fi network and the host are notified that the guest has joined the Wi-Fi network.

Single SSID, Multiple Password Onboarding—Host Initiated

Figure 16:
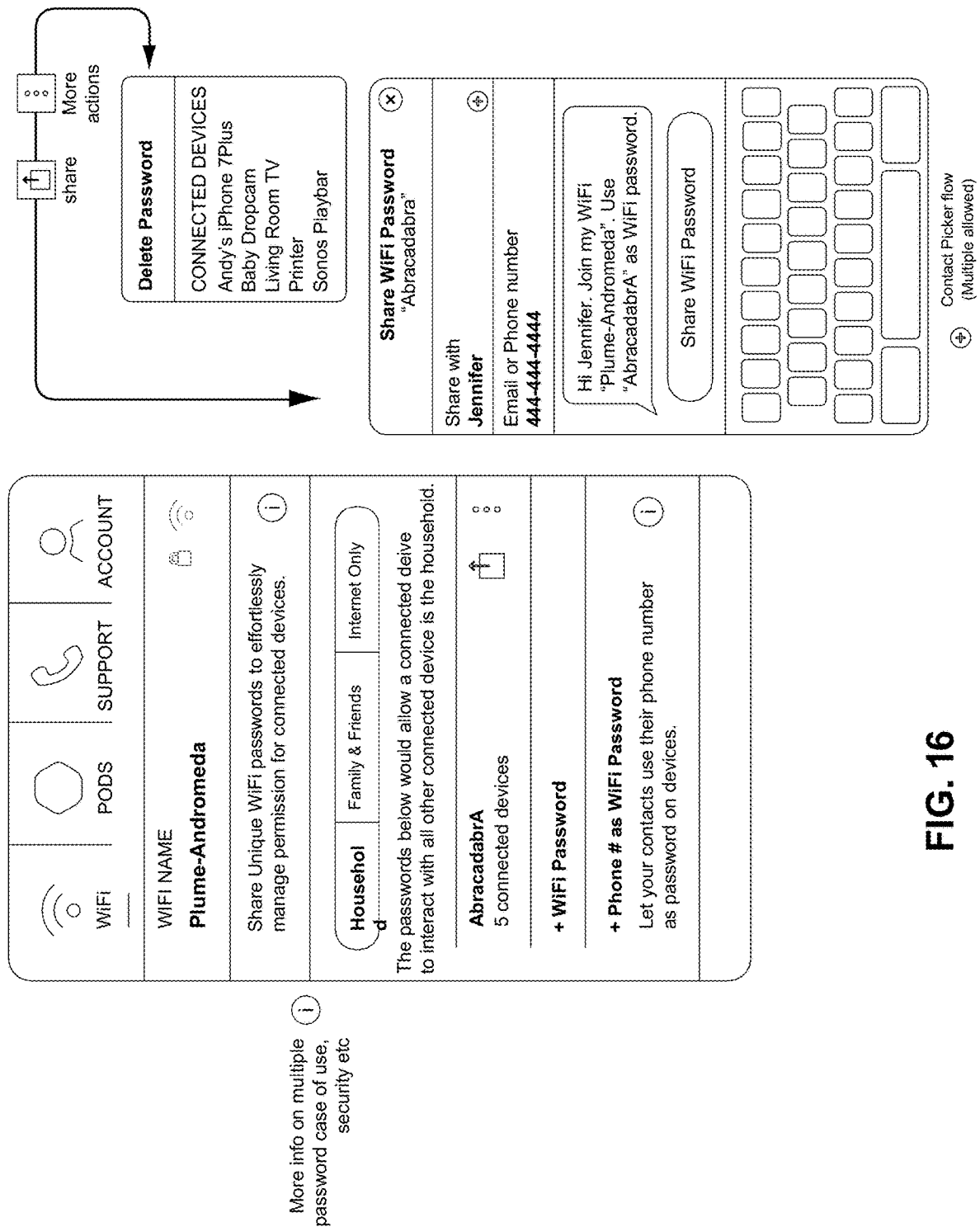
FIGS. 16-20 are a series of screenshots illustrating a single SSID, multiple password (key) onboarding initiated by the host.
Figure 17:
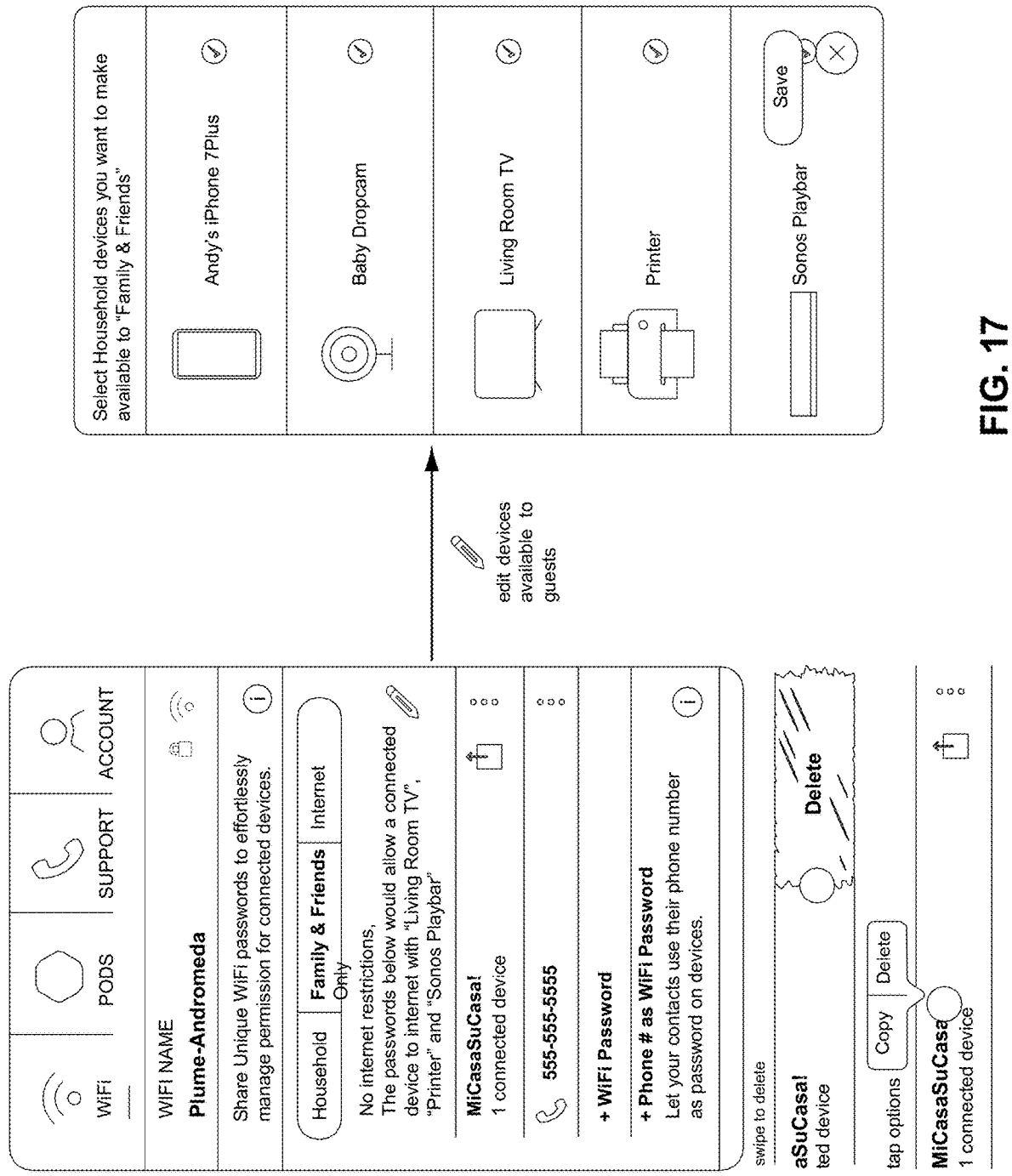
Figure 18:
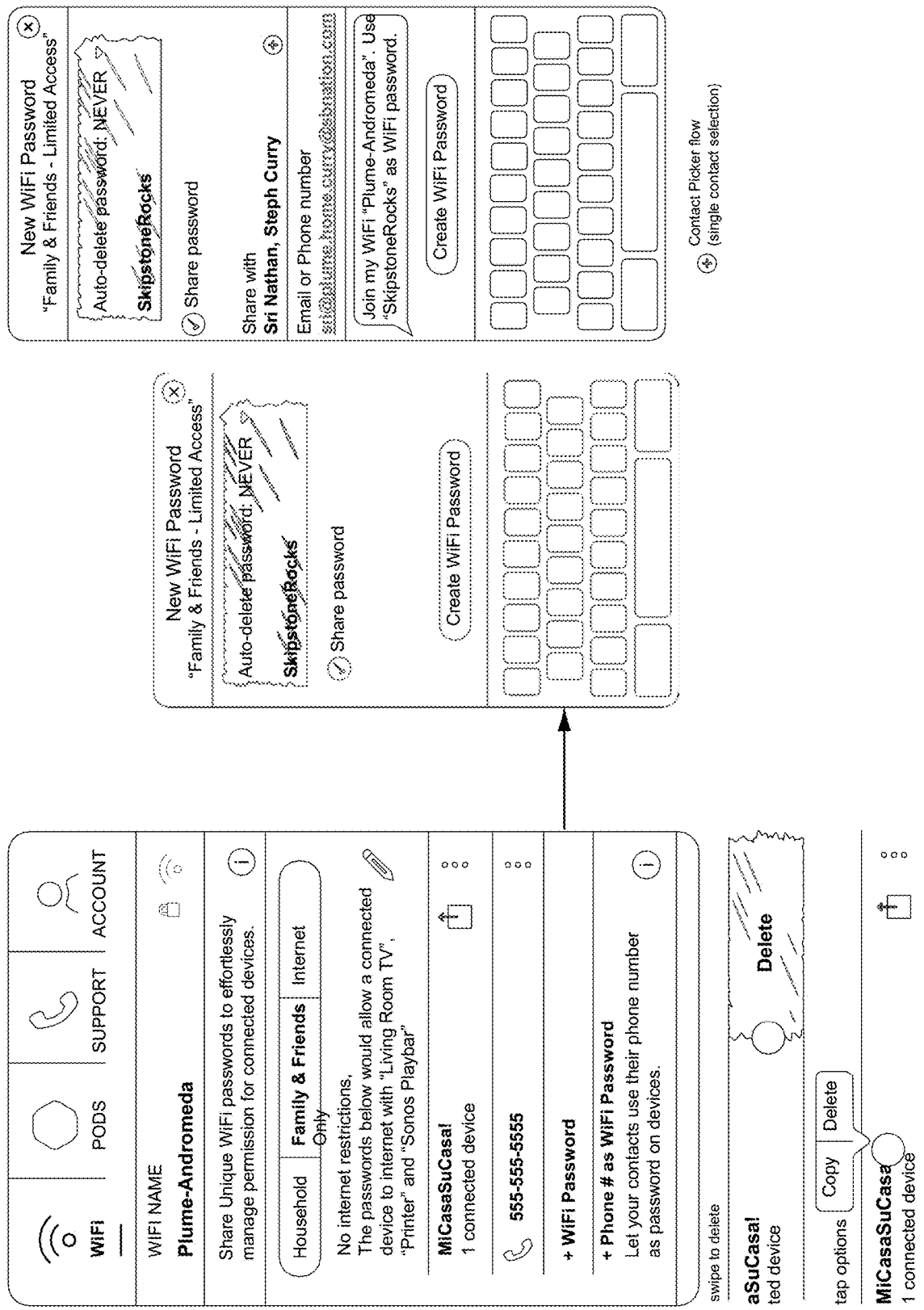
Figure 19:
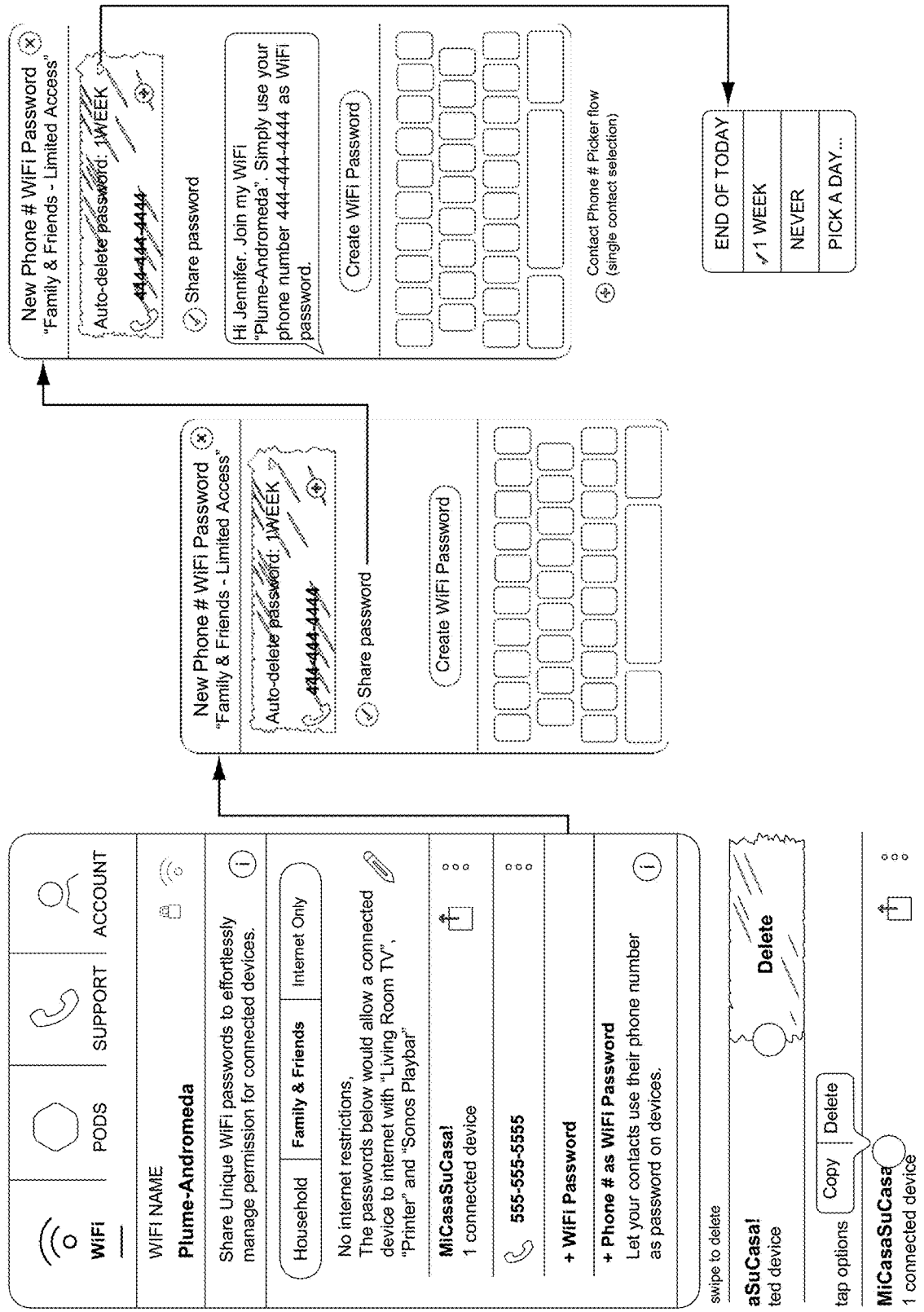
Figure 20:
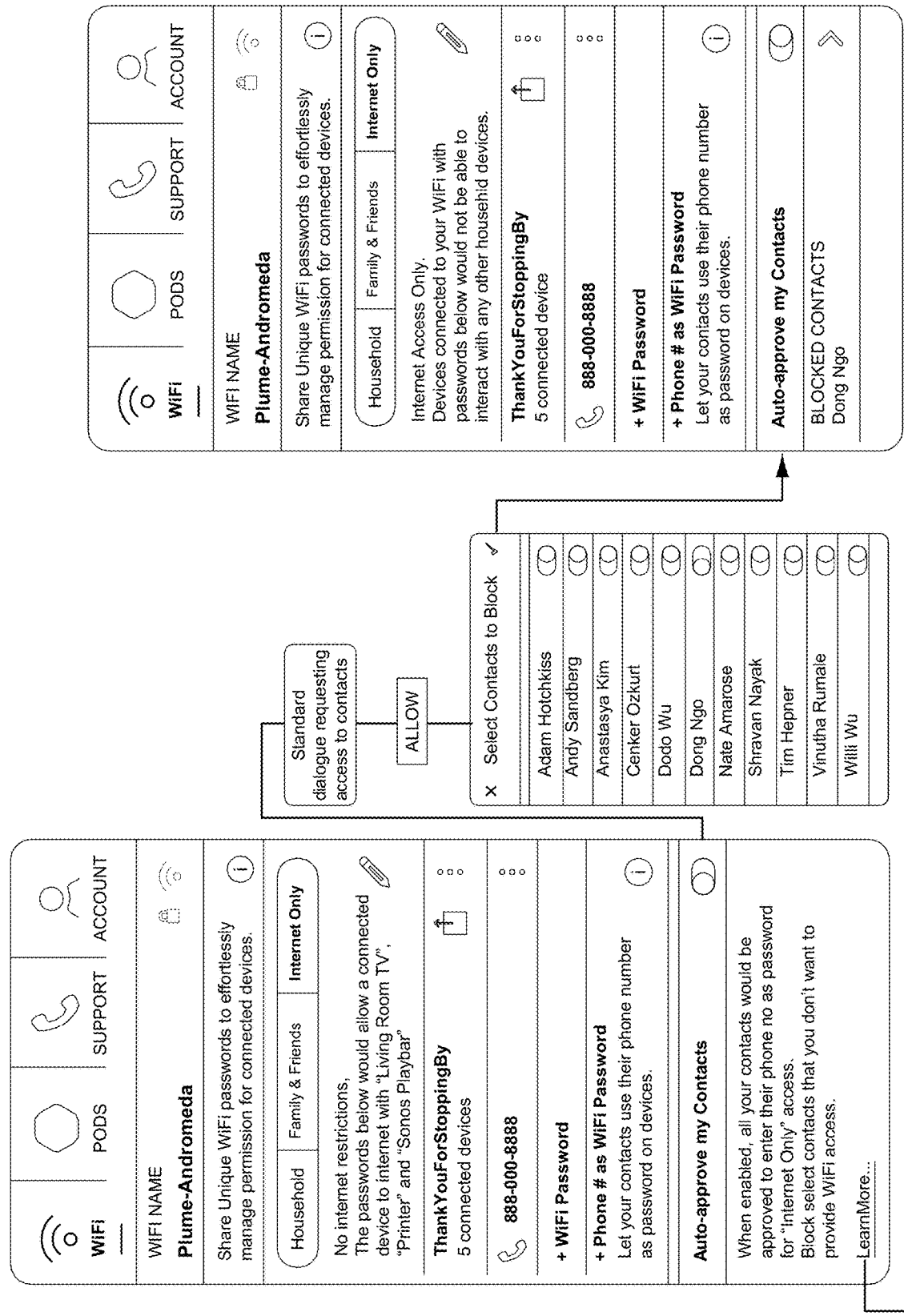

FIGS. 16-20 are a series of screenshots illustrating a single SSID, multiple password (key) onboarding initiated by the host. In FIG. 16, the host creates the key and then shares the key with designated guests. In FIG. 17, the host edits devices on the Wi-Fi network available to the guests in the Friends & Family access zone. In FIG. 18, the host creates a new Wi-Fi password (SkipstoneRocks) and shares this password with various guest users via email. In FIG. 19, the host uses a guest's phone number as a password for one week. In FIG. 20, the host can auto-approve contacts in the host's contact list for access to the Wi-Fi network, e.g., using each guest's email or phone number as the password.

Single SSID, Multiple Password Onboarding—Guest Onboarding Experience

Figure 21A:
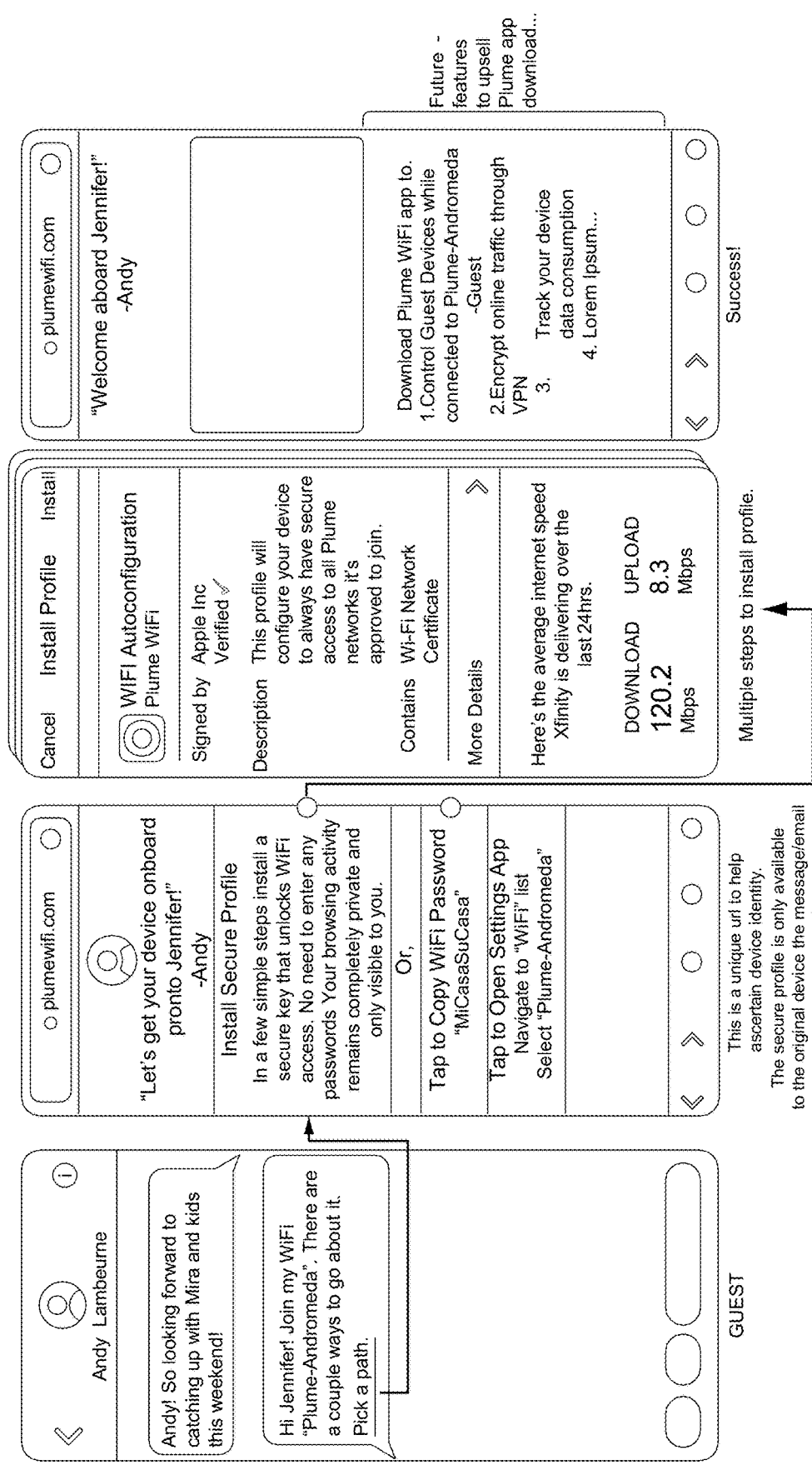
FIGS. 21A-21C and 22A-22B are a series of screenshots illustrating a single SSID, multiple password (key) onboarding from the guest's perspective.
Figure 21B:
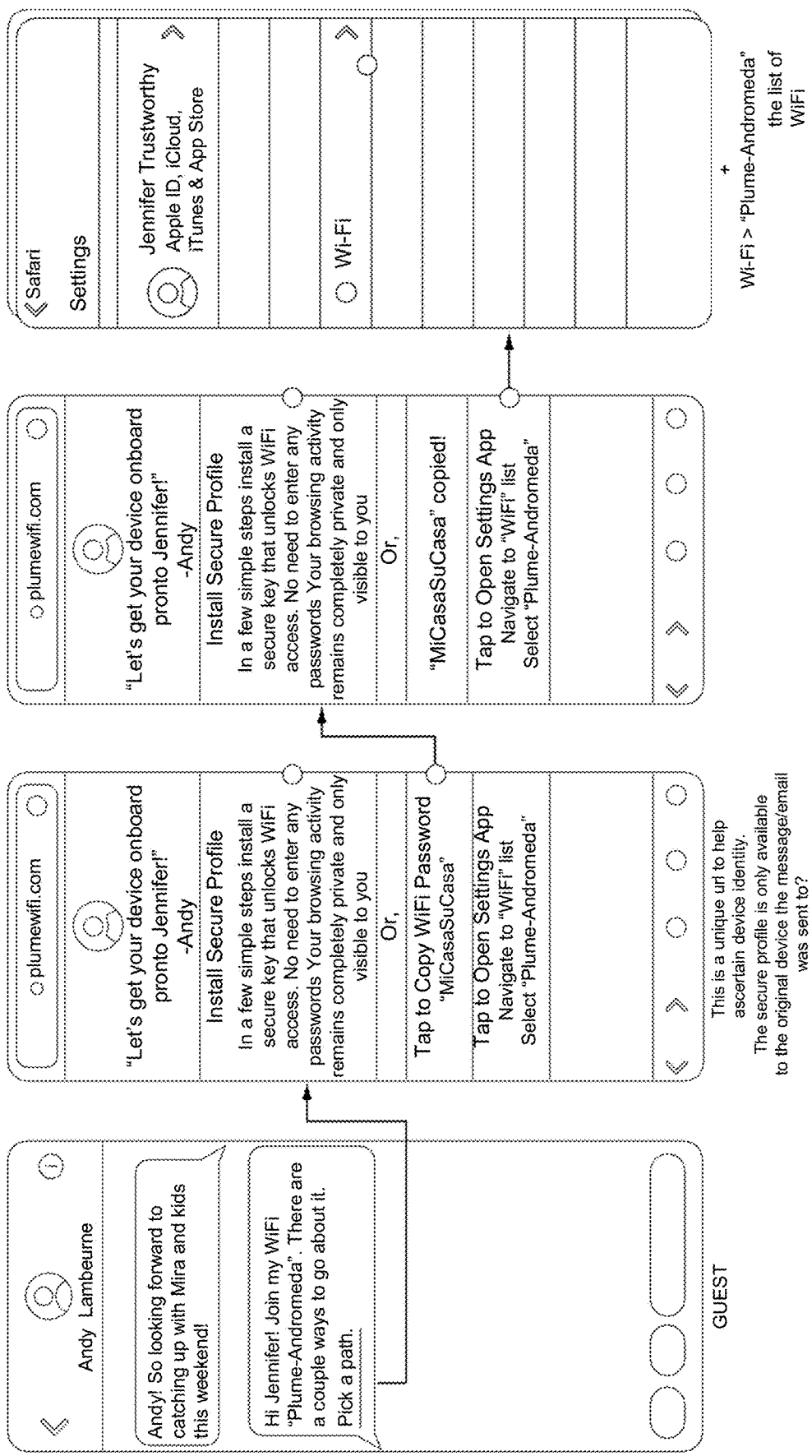
Figure 21C:
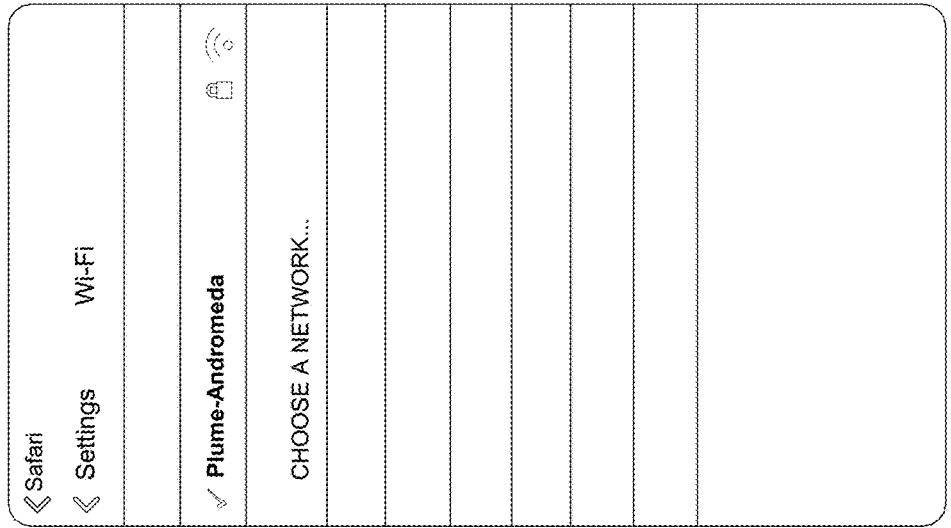
Figure 21C:
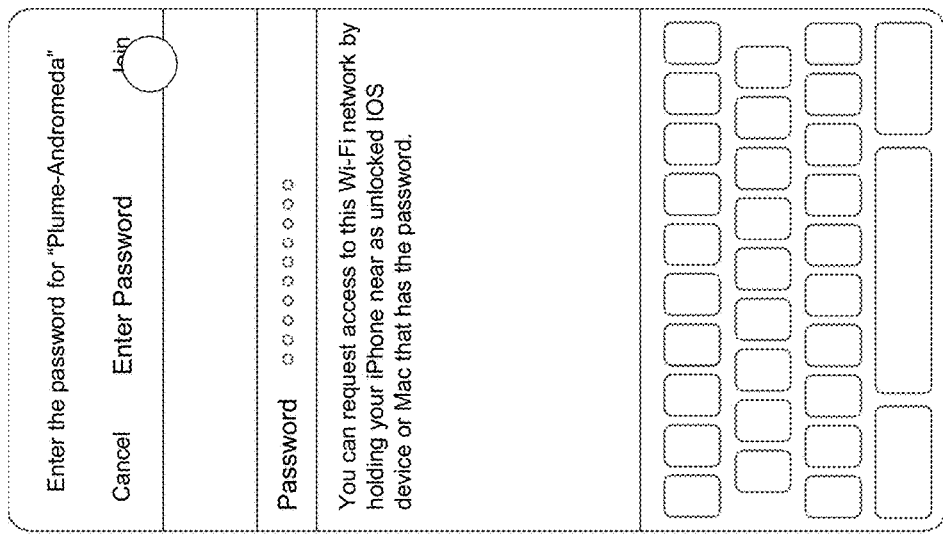
Figure 22A:
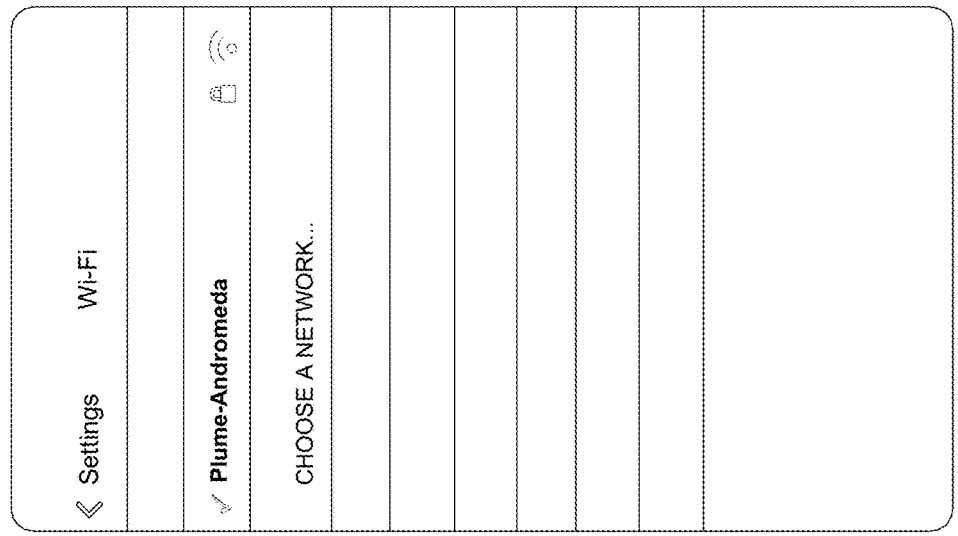
Figure 22A:
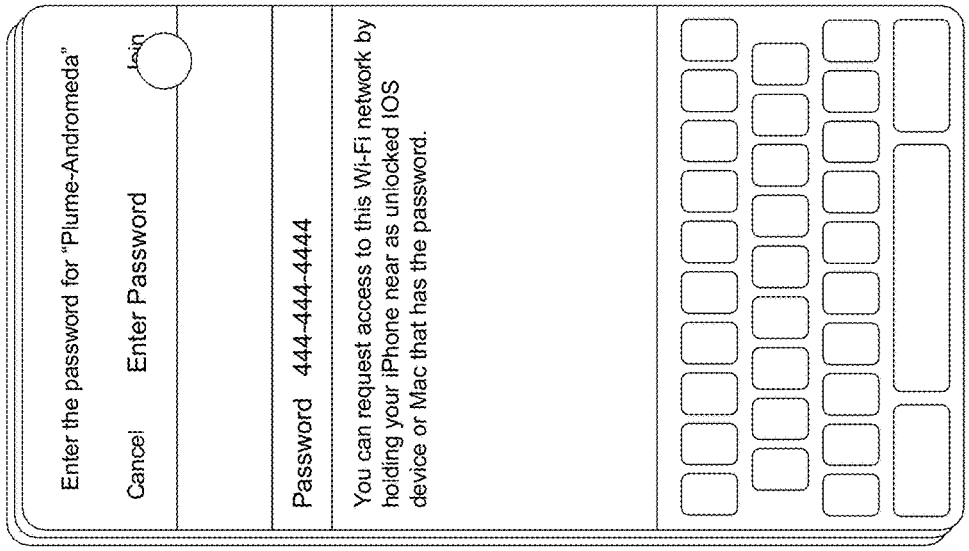
Figure 22A:
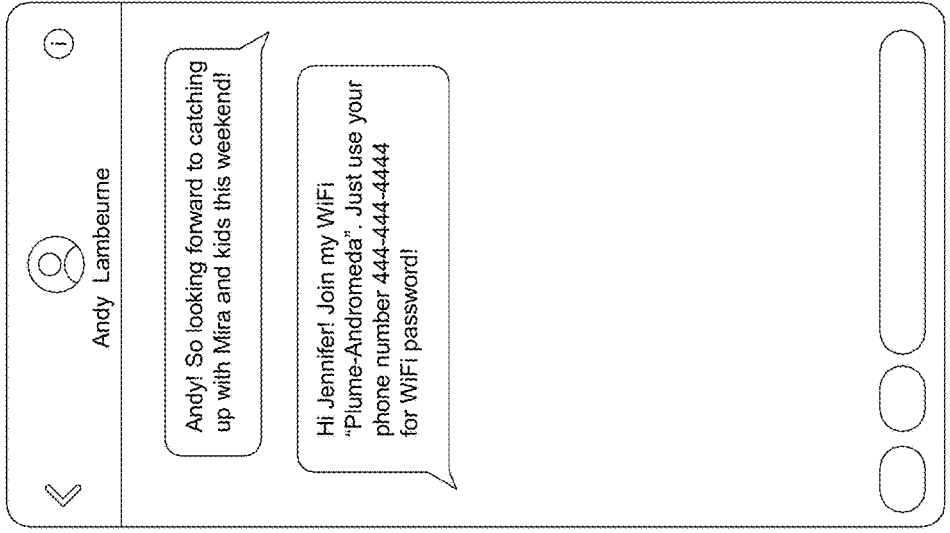
Figure 22B:
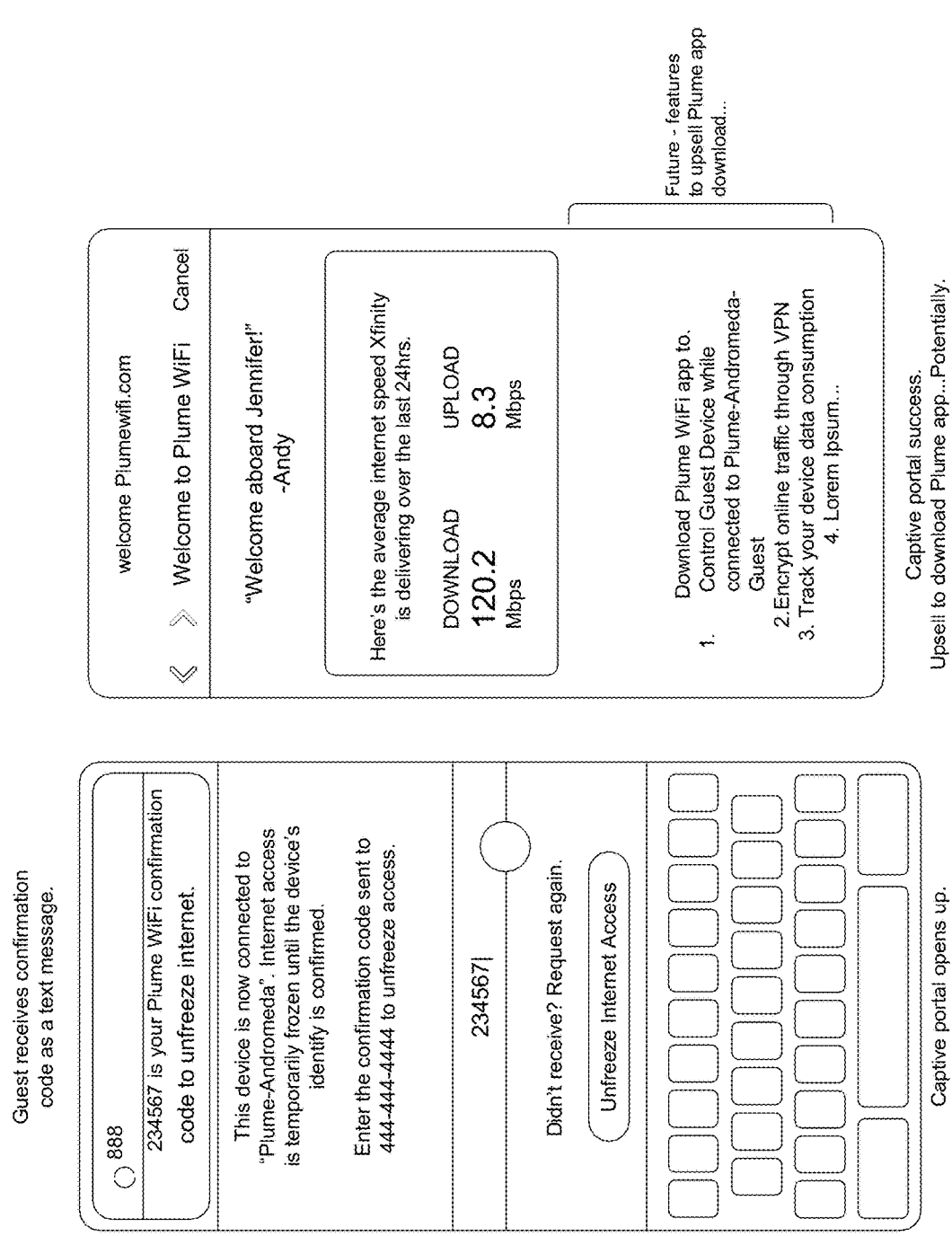

FIGS. 21A-21C and 22A-22B are a series of screenshots illustrating a single SSID, multiple password (key) onboarding from the guest's perspective. FIGS. 21A-21C illustrate a regular alphanumeric password and FIGS. 22A-22B illustrate a phone number as a password. In FIGS. 21A-21C, the alphanumeric password is sent to the guest via a text message. The guest can click on a (URL) which allows the guest to either install a secure profile (Wi-Fi certificate) or copy the password. In FIGS. 22A-22B, the guest can use their phone number for the key.

Host Management

Figure 23A:
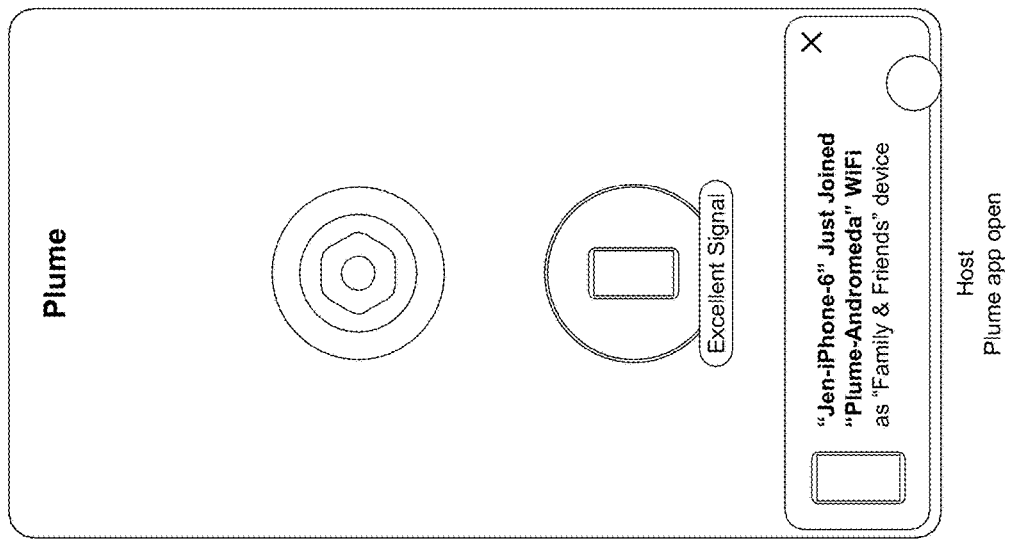
FIGS. 23A-23B and 24A-24A are a series of screenshots illustrating new device join notification (FIGS. 23A-23B) and guest device management (FIGS. 24A-24B)
Figure 23A:
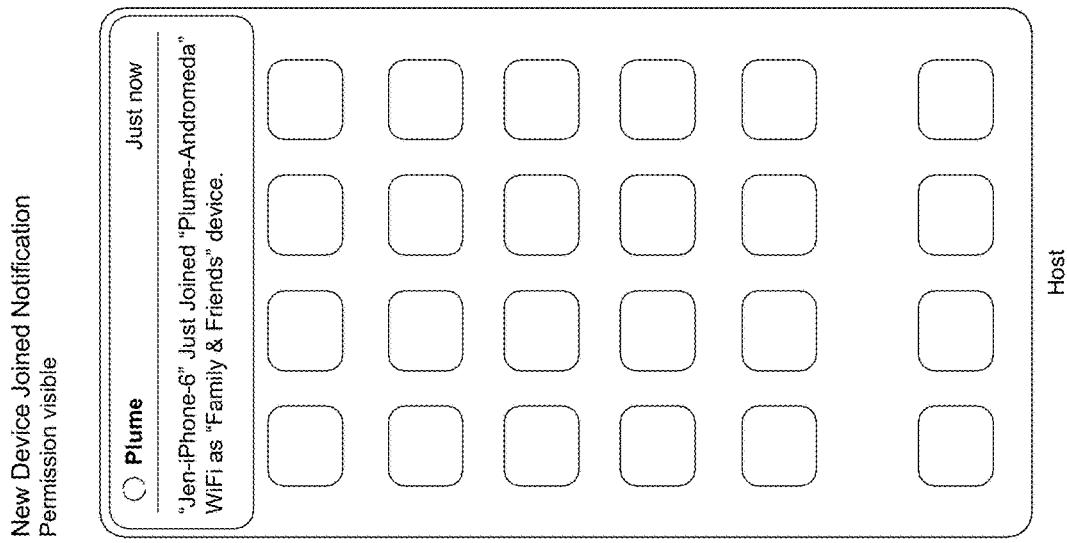
Figure 23B:
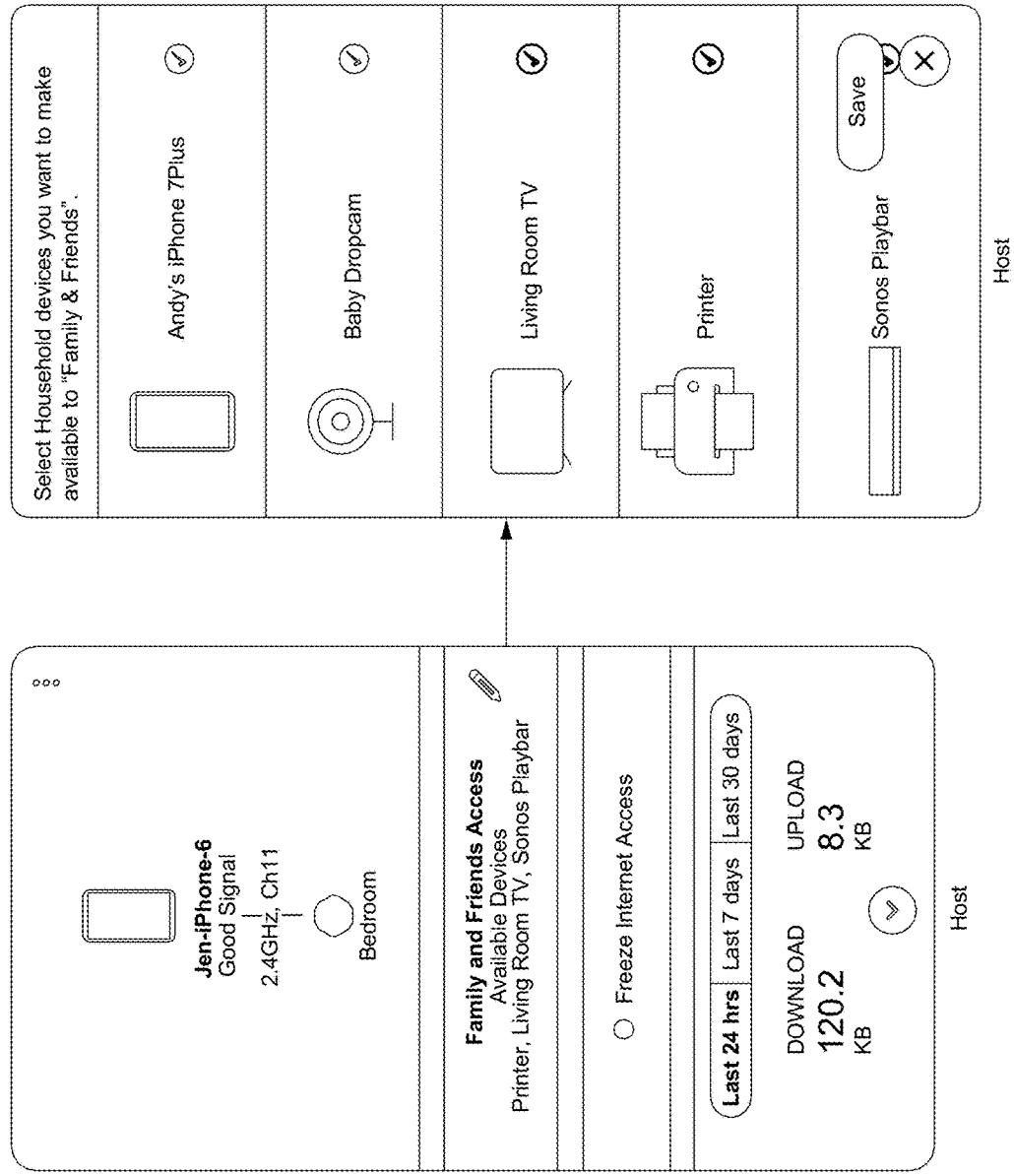
Figure 24A:
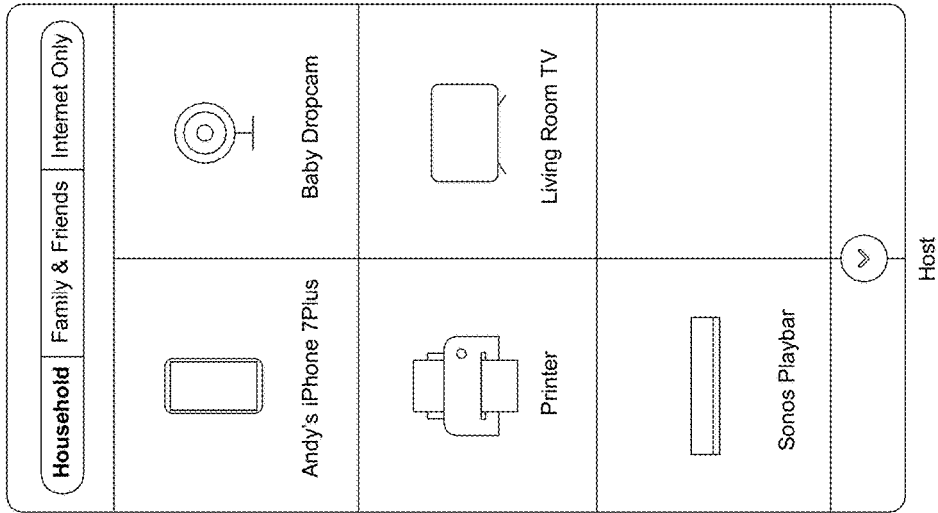
Figure 24A:
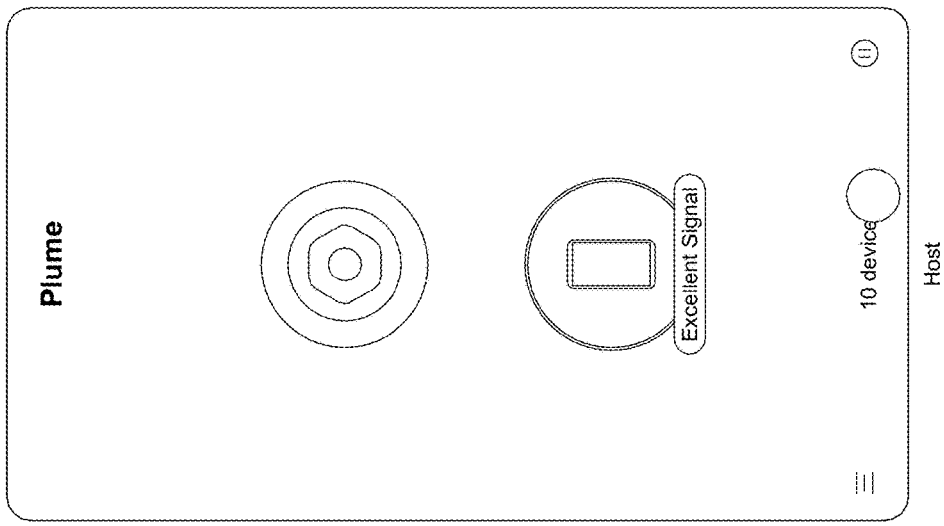
Figure 24B:
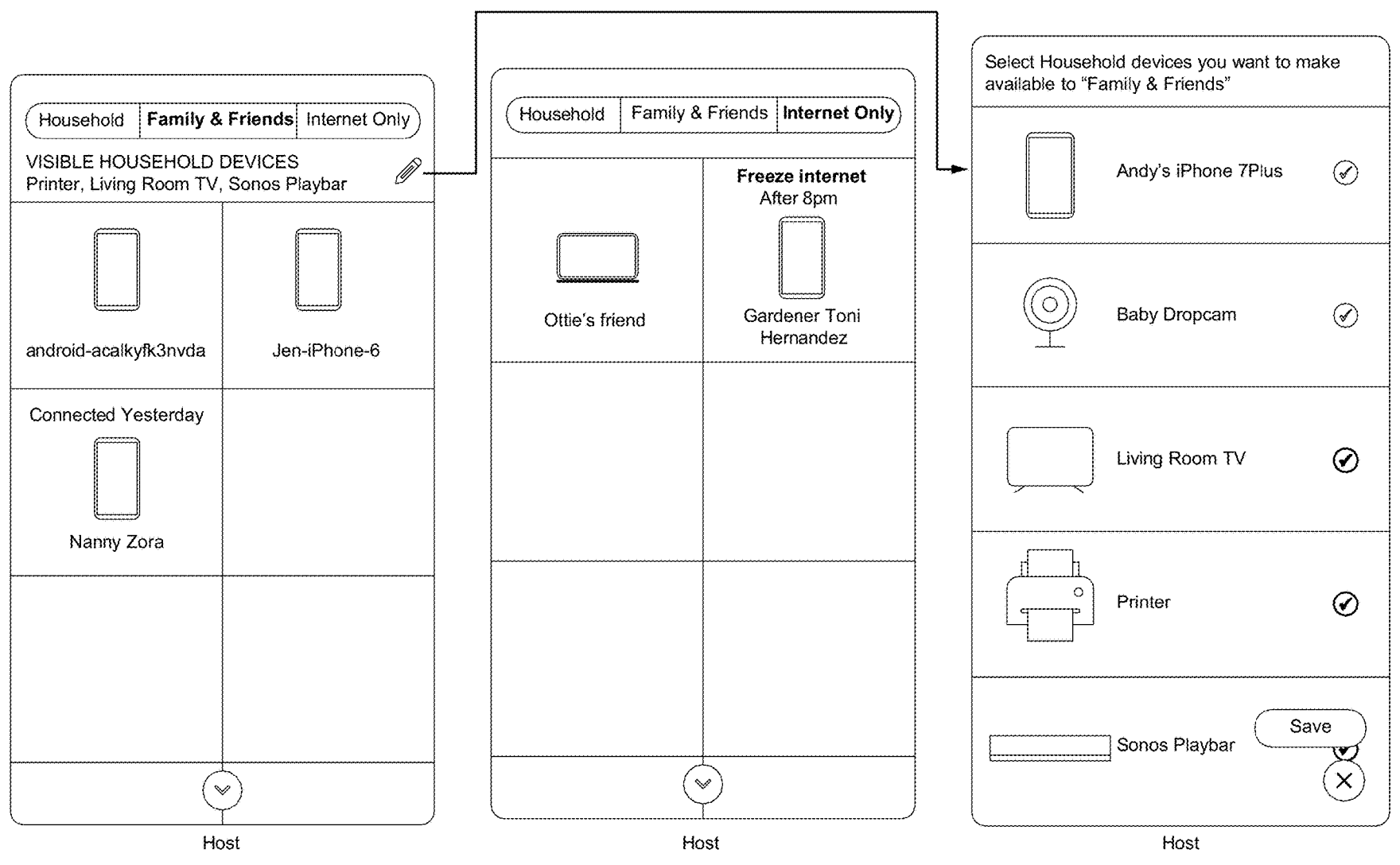

FIGS. 23A-23B and 24A-24A are a series of screenshots illustrating new device join notification (FIGS. 23A-23B) and guest device management (FIGS. 24A-24B). These screenshots are displayed to the host notifying new guests have joined as well as displaying activity and access zone capability.

Passwords

As described herein, a password (key) for each access zone may be generated by the host. There can be any number of passwords for each access zone, although the count may be limited for practical purposes. For each access zone, a Wi-Fi password may be edited by the host. For each access zone, the user may disable any of the Wi-Fi passwords. When the disabling takes place, all devices that had connected using that password will be kicked off and the password removed. The Wi-Fi password may then be subsequently re-enabled, and all devices using that password are then allowed to reconnect automatically. For each Access zone, host user may delete any of the Wi-Fi passwords. When the delete takes place, all connected devices using that password will be kicked off the password removed. The time to add, edit, delete, disable or re-enable a password for any access zone can be less than 2 seconds before it becomes active on the Wi-Fi network, through the cloud-based controller.

The host can also disable or delete the original Home password. However, the last home password cannot be disabled or deleted. When the original home password is disabled, then the next oldest password becomes the primary password.

Device Permissions

The host is able to select which devices on the Home access zone are allowed to communicate with devices connected to the Guests access zone. Devices that are selected have full layer 2 connectivity to the other devices on the Guest network. The host is able to deselect at any time the devices on the Home access zone that are allowed to communicate with the devices connected to the Guests NHA network. The selections and de-selections of Home AZ devices that are visible from the Guests NHA network can be applied to the Wi-Fi network within 3 seconds of making the selection, through the cloud-based controller. Similarly, devices may be added to or removed from any of the other access zones following the rules just described.

Devices connected to the Home access zone shall be able to see each other automatically. If a device is connected via Home access zone password, then it is a Home device, but if that same device connects with a Guest password, then it is now a Guest device and does not show up as a visible Home device. Devices connected to the Guests NHA access zone can be able to see each other automatically. Devices connected to the Internet Only access zone will be isolated from each other.

Internet Only Access Zone

If a Wi-Fi client device 16 connects to the SSID using a key for the Internet only access zone, the Wi-Fi client device 16 should not see other devices on the same network/subnet and other Wi-Fi client devices 16 should not see the Internet Only access zone devices. There are two approaches for enforcing this—access lists in OpenFlow and Virtual Local Area Networks (VLANs).

Implementation of Access Zones at the Networking Level

The network must control the flow of packets according to the access zones of the device originating the traffic, as well as the destination of the traffic. For example, the network must allow packets from an Internet Only zone device to travel from or to the Internet connection, but must block any packets that are destined for other devices in the home. This control is implemented via switching rules within the networking devices. Each access point 14 in a multi-AP environment, or the single access point 34 in a single AP environment contains a switch which is used to direct packets between ingress ports (reception) and egress ports (transmission). This switching control is controlled by switching tables that can direct arriving traffic to any number of egress locations. The switching control can also drop the packet, if there is no appropriate place for the traffic to be sent, or redirect the traffic, for example to a captive portal as described earlier.

There are a variety of ways of controlling and programming such switches known in the art. In the preferred embodiment, a Software Defined Network (SDN) is used for this purpose. Software Defined Networks, for example via an Open Virtual Switch (OVS), are particularly flexible and easily programmed dynamically, making them appropriate for this application. In the case of OVS, OpenFlow rules are used to specify the forwarding rules for packets from and to devices in the various access zones. Wi-Fi and Ethernet packets clearly identify their source and destination by MAC addresses. These MAC addresses are what the switch uses to identify source and destination, and therefore chose the correct action for the arriving packet. The OpenFlow rules are held within each access point 14, 34 or networking device within a database. In the case of OVS, the database within the device is the OVSDB. The rules within each OVSDB table are programmed by the cloud, specific to that access point and how that access point is connected into the Wi-Fi network. These tables hold the forwarding rules for all packets, including packets that violate the zone restrictions, and the proper forwarding ports for packets that are legitimate. The sequence is therefore that an app on the user device 22 or the like connects to the server 20 in the cloud 12 to specify the zones, keys, etc. The cloud 12 then configures the OVSDB tables in all of the access points 14, 34 to enable the OVS switch to implement the rules as desired.

The solution just described implements the access control in a distributed way, on each networking device in a distributed network system, rather than in a single networking device, for example, the gateway. This distributed switching control has a number of advantages. First, it supports blocking of extremely local traffic, for example between two devices, both connected to the same access point 14, but which should not be able to pass traffic to each other. Were the forwarding rules implemented only on the gateway in a distributed Wi-Fi system 10, such local traffic might not be routed through the gateway. In that case, the forwarding rules would not have a chance to block the traffic, and barred communication between devices in different access zones could occur. Second, it is efficient regarding network traffic flow by blocking illegal traffic (violating the access zone rules) at the first opportunity. Otherwise, illegal traffic would have to be carried through the network to the centralized gateway before the traffic would be identified as illegal and dropped. Similarly, a solution to the previously described problem of local traffic circumventing the forwarding rules would be to route all traffic to the gateway before passing it on to the destination. While this would allow the blocking of very localized traffic by the forwarding rules, it would be inefficient on network resources, requiring all traffic, even traffic destined for a device connected to the same access point, to be passed through the entire network to the gateway, and then passed back down again.

Again, each device in the Wi-Fi network can be managed using OpenFlow. For access lists, traffic is manipulated with an OpenFlow manager so that Internet Only clients can only reach a gateway along with various rules. On the device a guest client is connected, an access list is applied for Address Resolution Protocol (ARP) and IP traffic at the Ethernet level. For unicast traffic, two rules are needed—unicast traffic is only allowed between the client and gateway, and other unicast traffic is dropped. The ARP traffic is only broadcast to the gateway and replies only from the gateway. Also, to isolate the Internet Only access zone devices, the broadcast domain must be separated. A first approach can include redirecting broadcast traffic over proxies as unicast traffic to the gateway. A second approach can include rewriting the address of the broadcast to a unicast address of the gateway.

For VLANs, each client or group of clients can be tagged with VLAN, with which we separate broadcast domains. Tagged traffic is then transparently switched over the network encapsulated inside Generic Routing Encapsulation (GRE) tunnels towards the gateway. On the gateway itself, this VLAN with can be terminated with different subnet than other clients. This can also be a subnet of whole network using mask 30. Or it can proxy to the original. This subnet would then have only Network Address Translation (NAT) option on the gateway, without the possibility of intervlan routing to other networks.

Wi-Fi Network in a Business Deployment

Again, the distributed Wi-Fi system 10, the single access point system 30, the Wi-Fi mesh network 32, and the Wi-Fi repeater network 33 can be deployed in a business location, i.e., office, store, warehouse, or any physical location. The same hardware and all of the same functionality described above can apply to the Wi-Fi networks in a business deployment. The business deployment does have differences from a home deployment including the fact that the Wi-Fi client devices 16 may come and go more often. However, the main principles are similar with respect to the access zones described herein. The home deployment described a home access zone, a guest access zone, and an Internet access only access zone. For a business deployment, there can be a secure access zone, an employee access zone, and a guest access zone. Similar functionality described herein for the home deployment can apply to the business deployment.

Business Access Zones

The secure access zone can include sensitive devices and restrictive access. The employee zone is meant for a business's employees who have a need to access more secure resources, e.g., file shares, hosted applications, etc. The guest zone is meant for a business's customers, visitors, partners, etc. and is meant to have Internet access only and possible access to some devices, e.g., printers, streaming media devices, etc.

The following description is provided with these three zones. Those of ordinary skill in the art will appreciate the present disclosure contemplates a plurality of zones, such as only two zones, e.g., an employee/secure zone and a guest zone, as well as more than three zones. The description of the secure access zone, the employee access zone, and the guest access zone is presented for illustration purposes. Also, the description herein may simply refer to each as a "zone" without access, and that should be considered equivalent to the description herein referencing the access zones.

In an embodiment, each zone may have a unique SSID for the users to see separately. Although, the implementation of the business access zones can equally use a single SSID as described herein with respect to the home access zones. Having different SSIDs is more secure, and naturally leads network management to set things up correctly. Stated differently, having a single SSID is important for simplicity in the home, but less likely in a business Wi-Fi network.

Business Zone Connectivity Via Two-Step and Two-Party Access

As described herein, the business zone connectivity can be referred to as two-step access and two-party access. Again, the approach described herein is referred to as two-step, two-party access for the Wi-Fi network, e.g., the distributed Wi-Fi system 10, the single access point system 30, the Wi-Fi mesh network 32, and the Wi-Fi repeater network 33.

Figure 25:
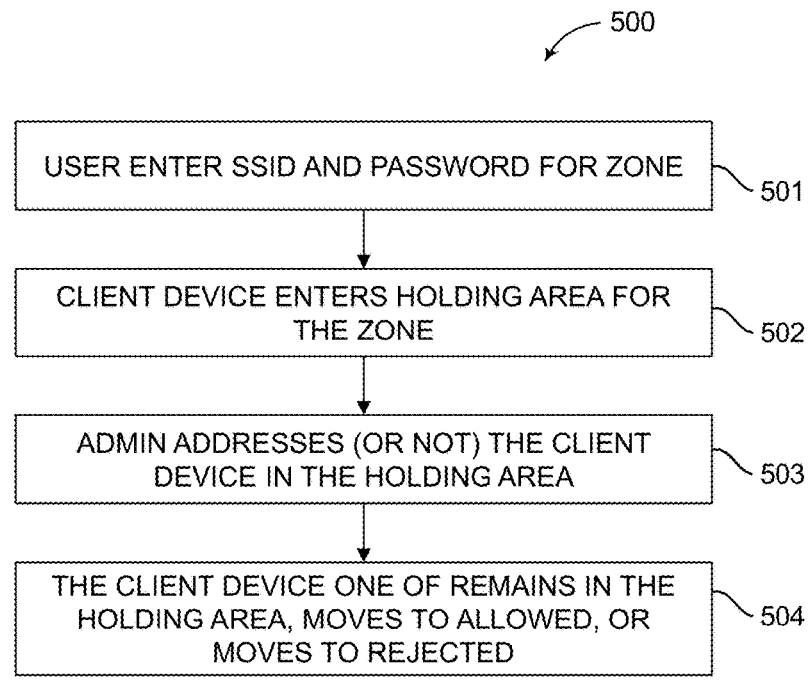
FIG. 25 is a flowchart of a two-step, two-party Wi-Fi network access process.
Figure 26:
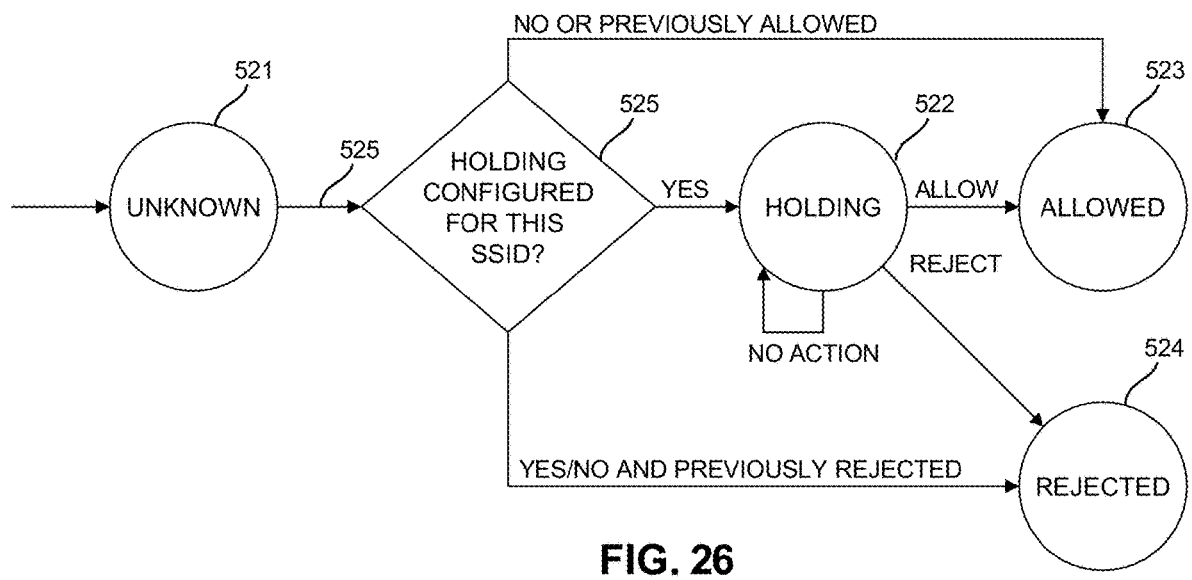
FIG. 26 is a state diagram of states and associated actions in a holding area of a zone.

FIG. 25 is a flowchart of a two-step, two-party Wi-Fi network access process 500. FIG. 26 is a state diagram of states and associated actions in a holding area of a zone. Again, this approach is referred to as two-step, namely SSID+password and the holding zone, and two-party, namely the user entering the SSID+password and the network administrator addressing the holding zone. The Wi-Fi network access process 500 includes a user of a Wi-Fi client device 16 entering an SSID and password for a zone of a Wi-Fi network (step 501). This is the first step of the two-steps and the first party (the user) of the two-party.

The Wi-Fi network access process 500 is described with reference to a generic zone. The zone in the Wi-Fi network access process 500 can be any of the zones described herein, including the zones for the home deployment, i.e., the home access zone, the guest access zone, or the Internet access only access zone. In a business deployment, the zone can be the secure access zone, the employee access zone, or the guest access zone. Again, the business deployment can have two zones as well, e.g., a secure/employee access zone and a guest access zone, as well as more than three zones.

There is an initial password required to access the zone, namely the SSID and the password for the first step. The initial password can be the same for all users and all Wi-Fi client devices 16 on a given SSID (zone). Of course, this approach is not the most secure, but it provides simplicity, while still requiring some degree of protection from random people obtaining free Internet access. That is, the shared password is used for simplicity because there is a second step and a second party involved for full access. The idea is a business deployment would post or otherwise make available the SSID and password to employees, customers, visitors, contractors, partners, etc. There is a balance between user experience and security here. That is, there is a need to widely distribute the SSID and password to a large number of users.

Upon entering the SSID and password, the Wi-Fi client devices enters a holding area for the zone (step 502). This holding area can be referred to as "purgatory," i.e., a state of limbo, in-between, etc., with some level of access to resources associated with the zone, but not full access. In between the two-steps by the two-parties, new Wi-Fi client devices 16 are place in the holding area.

The Wi-Fi network access process 500 contemplates operation at or in a combination of the access points 14, 34, 36, 38 in the Wi-Fi network and the cloud 12. In an embodiment, the Wi-Fi network access process 500 is performed at a single access point. In another embodiment, the Wi-Fi network access process 500 is performed across multiple access points, such as in the distributed Wi-Fi system 10, the Wi-Fi mesh network 32, and the Wi-Fi repeater network 33. In a further embodiment, the Wi-Fi network access process 500 is performed in the cloud 12 and/or via the server 20. When the Wi-Fi network access process 500 is performed in the cloud 12 and/or via the server 20, the cloud 12 and/or the server 20 can receive information from and forward configurations to the associated access points for implementation of aspects of the Wi-Fi network access process 500. Other configurations are also contemplated. That is, the functions performed with the Wi-Fi network access process 500 can be performed at any of the locations shown in FIGS. 1 and 2.

As part of the Wi-Fi network access process 500, there is a requirement to track the Wi-Fi client devices 16 for the purposes of uniquely identifying each device. That is, is this a new device to the zone in the Wi-Fi network that first joins and needs to be placed in the holding area. Conversely, is this a device that has already connected to zone in the Wi-Fi network and needs to be placed in the appropriate area (i.e., holding, allowed, rejected). In an embodiment, the Wi-Fi client devices 16 can be tracked and uniquely identified based on their Media Access Control (MAC) addresses. In another embodiment, such as where the Wi-Fi client device 16 utilizing MAC randomization, it is possible to use other information such as a hostID, user provided information, etc. In a further embodiment, such as where the Wi-Fi client device 16 utilizing MAC randomization, it is possible to just identify the device with the randomized MAC address just for the session. In yet another embodiment, it is possible to use other information such as a hostID, user provided information, etc.

Once a user has connected the Wi-Fi client device 16, an administrator of the Wi-Fi network is notified. This can be via a holding message, email, push notification, in-app notification, text message, etc. This can also be via updating a dashboard listing, network monitoring software, etc. That is, the notification can be a push notification to the administrator or a pull notification where the administrator goes to a dashboard. The notification includes information about the Wi-Fi client device 16 in the holding area, such as device type, hostname, whether the device has been in the holding area before (or any other history of the device with the Wi-Fi network), possibly a username or other personal identifier such as gathered by a captive portal or splash page, and the like.

The administrator can address the Wi-Fi client device 16 in the holding area or simply ignore it and leave it there (step 503). This is the second step of the two-steps and the second party (the administrator) of the two-party. Based on the action of the administrator, the Wi-Fi client device 16 one of remains in the holding area, moves to an allowed area, and moves to a rejected area (step 504). The administrator is someone who has management control of the Wi-Fi network, i.e., a network manager. In a business deployment, the administrator may be the business owner, an office manager, an IT administrator, etc. In a home deployment, the administrator may be the homeowner.

With Wi-Fi client devices 16 in the holding area in the zone, the administrator can approve the Wi-Fi client device 16 (move it to the allowed area), can disapprove the Wi-Fi client device 16 (move it to the rejected area), or take no action (let it remain in the holding area). For the zone, the approved area, the Wi-Fi client device 16 has full rights to the zone for which they have connected, including access to devices, the Internet, etc. The disapproved area means the Wi-Fi client device 16 gets no access rights at all. The Wi-Fi client device 16 is shown connected (as they had the correct password) in management tools, but the Wi-Fi client device 16 is not allowed to send or receive traffic to/from any destination or device, including Internet access.

In the holding area, the Wi-Fi client device 16 is waiting for a decision. However, this decision does not need to come. This advantageously allows some ability for connectivity and access. The holding area can allow the Wi-Fi client device 16 to have Internet access only, but no access to any devices or local resources in the zone. The Internet access only can also include other settings, which are customizable, such as no Internet access, Internet access for certain types of devices, policy restrictions, etc. The policy restrictions can include bandwidth limits, URL limitations, content filtering, etc.

Again, the Wi-Fi network access process 500 includes remembering the Wi-Fi client devices 16 that connect thereto and the decisions made based thereon for applying consistent policy. A Wi-Fi client device 16 that had full access approved to a zone, is automatically allowed full access on subsequent reconnection based on an identifier (e.g., the MAC address). A Wi-Fi client device 16 that was rejected is allowed to join the Wi-Fi network with password, but is not allowed to transmit or receive any information (including Internet access). There may be a notification or message alerting the administrators that a denied device is seen again.

A Wi-Fi client device 16 that is left in the holding area goes into holding area when it returns. In an embodiment, push type notifications may be suppressed for devices that return—once ignored they stay ignored, but an app or dashboard might have a list of all devices that have been ignored and are in the holding area. This list can potentially age out devices over time so that only recently connecting devices are maintained on the list.

The administrator (network manager) can revoke or change status of Wi-Fi client devices 16 at any time. This functionality and other functionality associated with the Wi-Fi network access process 500 can be controlled from an app (e.g., mobile application) or a dashboard (e.g., via a Web browser, etc.). In general, the Wi-Fi network access process 500 can include a UI for interaction by the administrator. The UI can include a listing of all known devices and their current permission state, known devices has above information shown for devices (hostname, device type, MAC address), and other relevant information. The administrator can move any device to full access, no access, or potential back to the holding area (Internet only). It is also possible to display an association between devices and users in the UI.

Again, the zone in the following description can be any type of zone—the secure access zone, the employee access zone, and the guest access zone. In an embodiment, the guest access zone can be treated differently, such as requiring no password (open to all), or having the passcode displayed or handed out openly. It is possible to configure the guest zone so messages are limited, sent in bulk, or omitted completely for the guest zone. Of course, it is possible to display in a passive manner the devices in the UI. The guest zone includes restrictive permissions—perhaps Internet access only, as well as more restrictive settings relative to content protection, perhaps prevents streaming video to save bandwidth, etc.

FIG. 26 is a state diagram of the states in the Wi-Fi network access process 500. The states include an unknown state 521, a holding area 522, an allowed area 523, a rejected area 524, and an optional decision point 525. Unconnected Wi-Fi client devices 16 are all in the unknown state 521, i.e., they are not presently connected to the Wi-Fi network. A Wi-Fi client device 16 connects to a zone in the Wi-Fi network with the SSID and the password, if the holding area is configured for this zone (point 525), the Wi-Fi client device 16 is moved to the holding area 522. If the holding area is not configured or if the Wi-Fi client device 16 was previously allowed, the Wi-Fi client device 16 is moved to the allowed area 523. If the holding area is configured and the Wi-Fi client device 16 was previous rejected, the Wi-Fi client device 16 is moved to the rejected area 524. Note, the decision point 525 is configurable as well as optional.

Software Defined Networking (SDN)

As described herein, SDN techniques can be used where each access point is configured as an SDN switch to gate traffic when devices have not been granted full access, and to gate different zones having different access levels.

Pin Holing

Again, the present disclosure includes a concept of pin holing where a particular device in one zone is granted some access to another zone. With pin holing, users, via their Wi-Fi client device 16 can be granted access to particular devices or capabilities that are in a different zone than where the person "naturally" resides. For example, security cameras may be deployed on the secure zone, but employees on the employee zone may need to access these devices. Similarly, Point of Sale (PoS) devices may be deployed on the secure zone, but employees on the employee zone may need to access these devices. The present disclosure enables configuration so that the employee's Wi-Fi client device 16 remains on the employee zone, but it can be granted access to devices on the secure zone.

The administrator can perform pin holing configuration via the app, dashboard, UI, etc. For example, the devices to be access can be visualized (e.g., see FIG. 23B, 24A, etc.) and selected and assigned to Wi-Fi client devices 16 in other zones. The access rules utilize SDN and the new rules are plumbed down to allow the SDN network to allow these pin holed connections. A "Person" who is being granted special access is actually the person's device(s). UI of app or dashboard might automatically enable all devices. This concept is called a "group". It might include the devices associated with a given person. This allows efficient management as an entire group can be configured at a particular time. A group might also be a group of similar devices, or devices with the same desired properties such as all web cams in a group. This pin holing involves devices being granted access to each other that are on different SSID which is unique in Wi-Fi to allow connections across different SSIDs. This again is handled by the SDN switch that can move traffic from one SSID to another.

Screenshots

Figure 27:
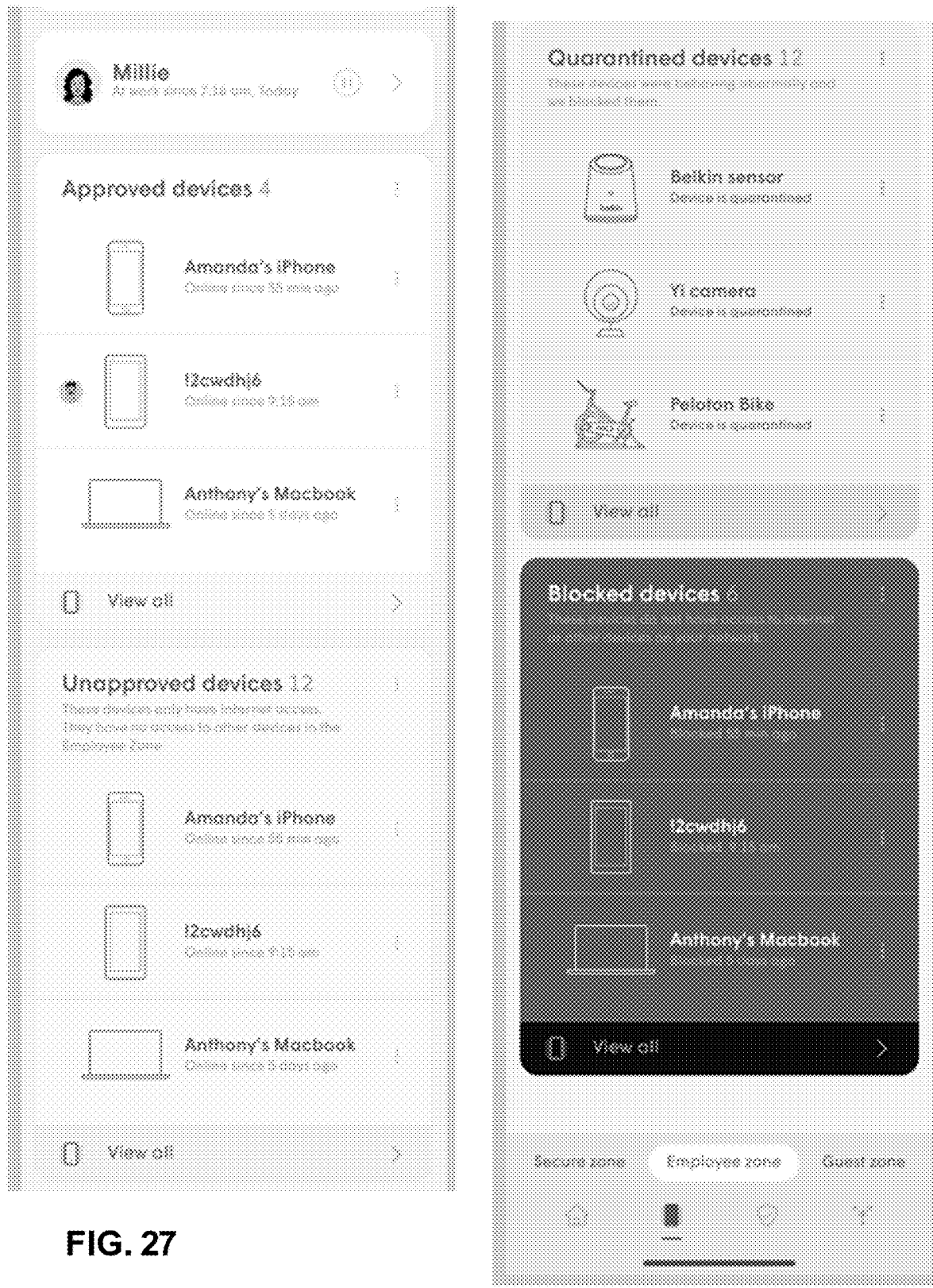
FIG. 27 is a screenshot of various devices in different areas of different zones based on the two-step, two-party Wi-Fi network access process of FIG. 25.

FIGS. 27-31 are various screenshots in an app, such as a mobile app, for performing various functions associated with the two-step, two-party Wi-Fi network access process 500, including pin holing. In an embodiment, the app is a mobile app configured to operate on a user device, i.e., the administrators of the Wi-Fi network. FIG. 27 is a screenshot of various devices in different areas of different zones based on the two-step, two-party Wi-Fi network access process 500. This screenshot can be scrollable with the left side being on top and the right side being on the bottom. The screenshot includes the three zones at the bottom right, with the employee zone shown for example. The first block includes approved devices ("allowed"). The second block includes unapproved devices ("holding area"). The third block includes quarantined devices which are devices that are isolated because of suspicious activity. The fourth block includes blocked devices.

Figure 28:
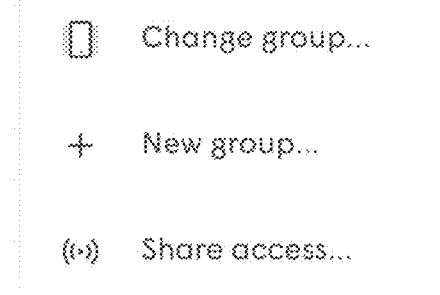
FIG. 28 is a screenshot of a menu in an app to share access of a device or group in the secure zone with the employee zone, for pin holing.
Figure 29:
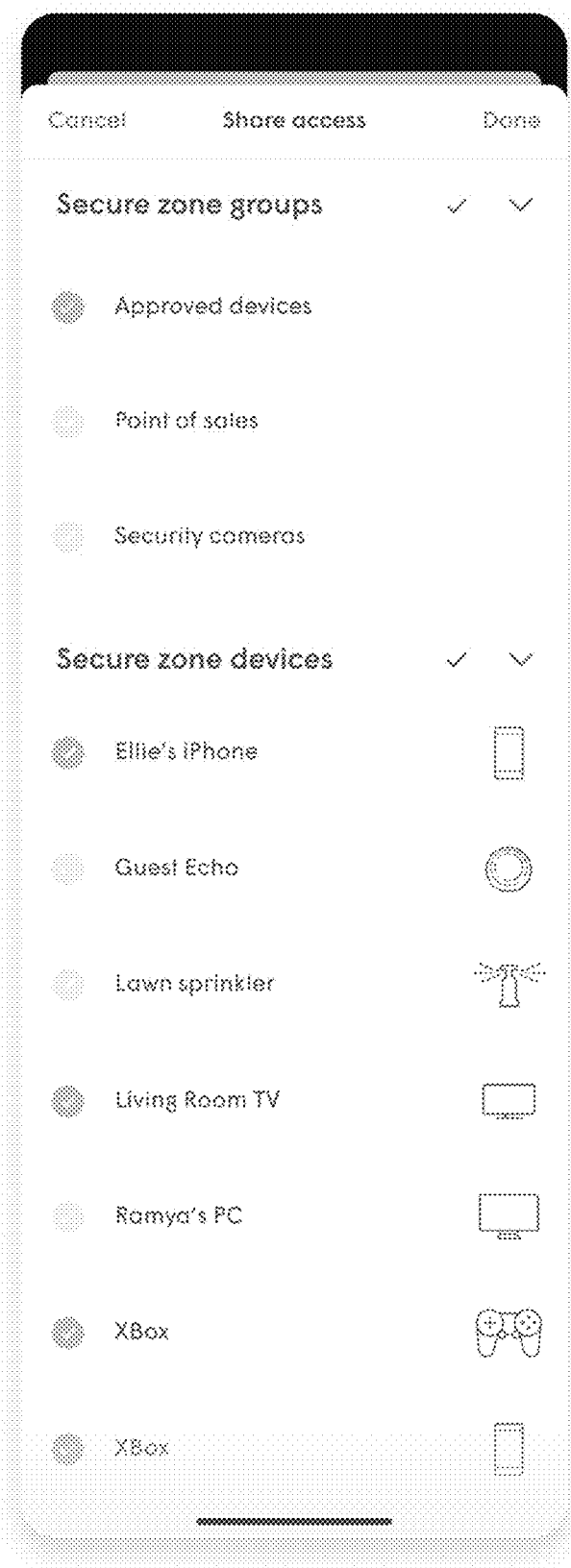
FIG. 29 is a screenshot for selecting a device or group to share in the secure zone, for pin holing.
Figure 30:
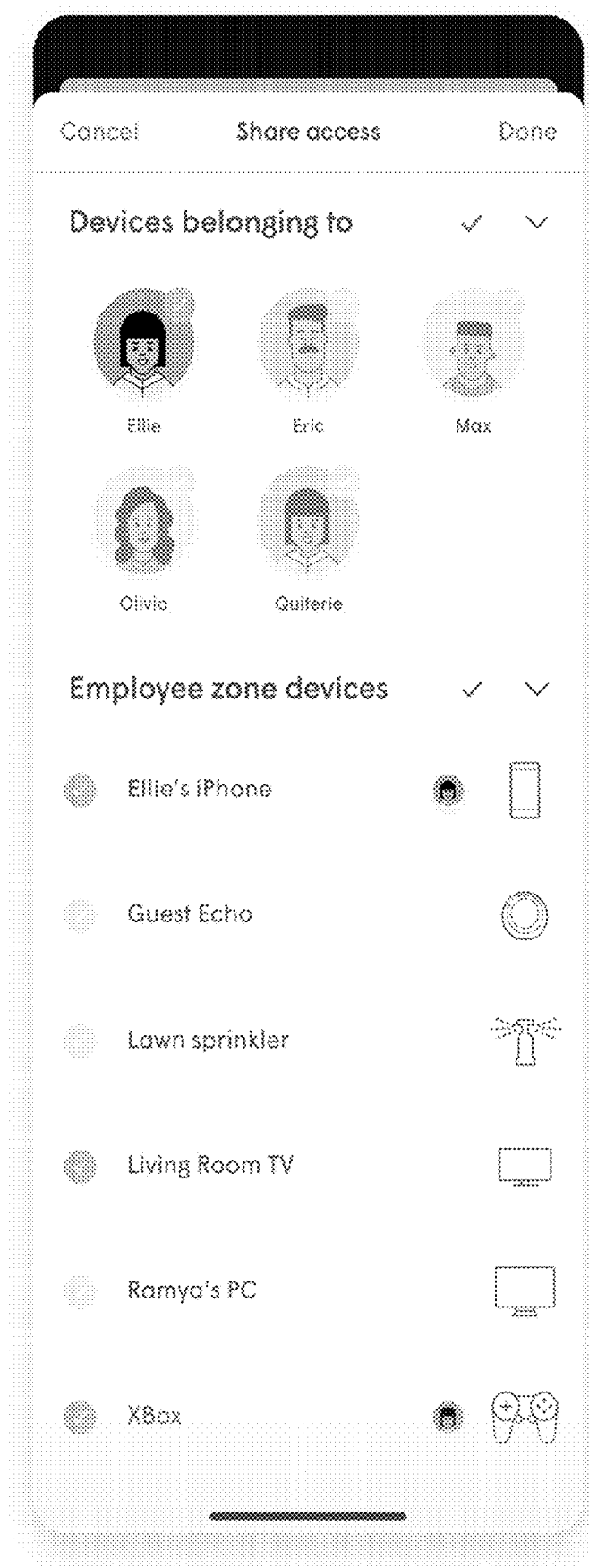
FIG. 30 is a screenshot for selecting a device or group to share in the employee zone, for pin holing.

FIG. 28 is a screenshot of a menu in an app to share access of a device or group in the secure zone with the employee zone, for pin holing. FIG. 28 is a menu in the app to share access of a device or group in secure zone with the employee zone. FIG. 29 is a screenshot for selecting a device or group to share in the secure zone, for pin holing. Here, a user selects the device or group that is to be shared from the secure zone. FIG. 30 is a screenshot for selecting a device or group to share in the employee zone, for pin holing. Here, the user selects the device or group in the employee zone that is to be shared from the screenshot in FIG. 29. A "group" is a group of devices the user sets up. Typically, this would be a person, but it could also be a group of like devices (e.g. all cameras).

Figure 31:
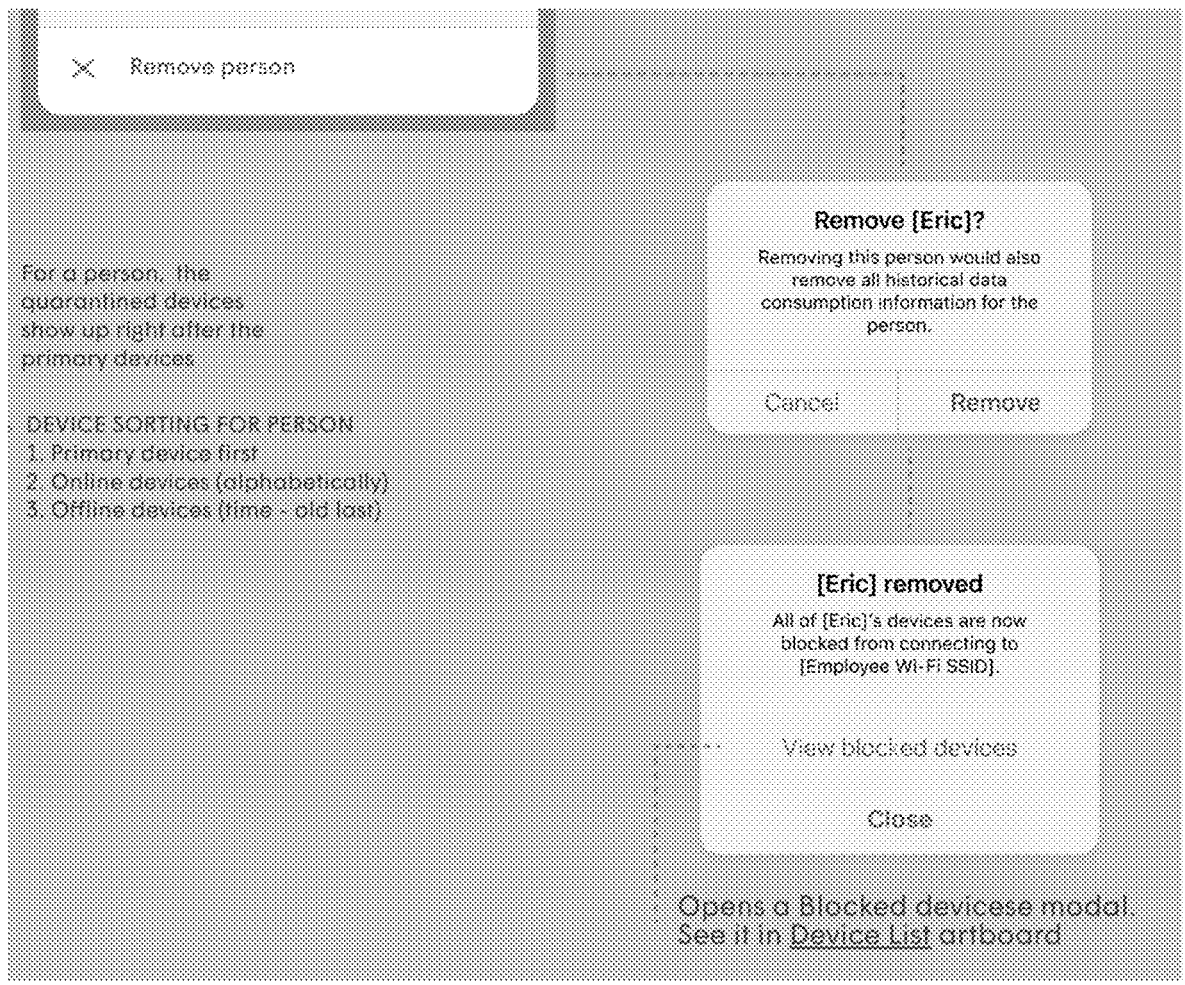
FIG. 31 are screenshots of showing steps for removing an employee.

FIG. 31 are screenshots of showing steps for removing an employee. Of course, when an employee is fired or quits, it is necessary to remove them. FIG. 31 shows how that happens. All their devices are moved to the blocked state when this happens.

CONCLUSION

It will be appreciated that some embodiments described herein may include one or more generic or specialized processors ("one or more processors") such as microprocessors; Central Processing Units (CPUs); Digital Signal Processors (DSPs): customized processors such as Network Processors (NPs) or Network Processing Units (NPUs), Graphics Processing Units (GPUs), or the like; Field Programmable Gate Arrays (FPGAs); and the like along with unique stored program instructions (including both software and firmware) for control thereof to implement, in conjunction with certain non-processor circuits, some, most, or all of the functions of the methods and/or systems described herein. Alternatively, some or all functions may be implemented by a state machine that has no stored program instructions, or in one or more Application Specific Integrated Circuits (ASICs), in which each function or some combinations of certain of the functions are implemented as custom logic or circuitry. Of course, a combination of the aforementioned approaches may be used. For some of the embodiments described herein, a corresponding device in hardware and optionally with software, firmware, and a combination thereof can be referred to as "circuitry configured or adapted to," "logic configured or adapted to," etc. perform a set of operations, steps, methods, processes, algorithms, functions, techniques, etc. on digital and/or analog signals as described herein for the various embodiments.

Moreover, some embodiments may include a non-transitory computer-readable storage medium having computer readable code stored thereon for programming a computer, server, appliance, device, processor, circuit, etc. each of which may include a processor to perform functions as described and claimed herein. Examples of such computer-readable storage mediums include, but are not limited to, a hard disk, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory), Flash memory, and the like. When stored in the non-transitory computer-readable medium, software can include instructions executable by a processor or device (e.g., any type of programmable circuitry or logic) that, in response to such execution, cause a processor or the device to perform a set of operations, steps, methods, processes, algorithms, functions, techniques, etc. as described herein for the various embodiments.

Although the present disclosure has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present disclosure, are contemplated thereby, and are intended to be covered by the following claims.

What is claimed is:

1. A method comprising:
   responsive to a Wi-Fi client device providing a password for a zone of a Wi-Fi network, determining a status of the Wi-Fi client device;
   when the status of the Wi-Fi client device is unknown, placing the Wi-Fi client device in a holding area associated with the zone, wherein the Wi-Fi client device is connected to the Wi-Fi network while in the holding area and has restricted access that is less than full access to the zone in an allowed zone;
   responsive to placing the Wi-Fi client device in the holding area, causing a notification to an administrator that the Wi-Fi client device is in the holding area; and
   with the Wi-Fi client device in the holding area, one of moving the Wi-Fi client device to the allowed area, moving the Wi-Fi client device to a rejected area for the zone, and leaving the Wi-Fi client device in the holding zone, based on any input or lack thereof from the administrator.

2. The method of claim 1, further comprising
   when the status is previously allowed, placing the Wi-Fi client device in the allowed zone directly.

3. The method of claim 1, further comprising
   when the status is previously rejected, placing the Wi-Fi client device in the rejected zone directly and providing a notification to the administrator.

4. The method of claim 1, wherein the notification includes any of a push notification, an email, an in application notification, an update in a dashboard, and an update in a User Interface, and wherein the notification includes device information and device history.

5. The method of claim 1, further comprising
   tracking the input or lack thereof for the Wi-Fi client device for future connections and uniquely identifying the Wi-Fi client device by any of a Media Access Control (MAC) address and a host identifier.

6. The method of claim 1, wherein the zone is one of a plurality of zones including at least an employee zone and a guest zone, and each zone includes a different Service Set Identifier (SSID).

7. The method of claim 1, wherein the restricted access includes Internet access only.

8. The method of claim 7, wherein the restricted access further includes any of bandwidth limitation, content filtering, and site restrictions.

9. The method of claim 1, further comprising
   providing a User Interface (UI) to the administrator via any of a Web page, a dashboard, and a mobile application, wherein the UI includes a listing of Wi-Fi client devices in the holding area for the zone.

10. The method of claim 9, further comprising
    subsequent to the one of moving the Wi-Fi client device to the allowed area and moving the Wi-Fi client device to the rejected area for the zone, receiving an updated selection from the administrator via the UI.

11. The method of claim 1, further comprising
    providing Software Defined Networking (SDN) rules to one or more access points associated with the Wi-Fi network for implementing the zones and associated access restrictions.

12. The method of claim 1, wherein the zone is a first zone, and further comprising
    receiving a configuration allowing the Wi-Fi client device to access one or more devices in a second zone separate from the first zone.

13. A non-transitory computer-readable storage medium having computer readable code stored thereon for programming a device to perform steps of:
    responsive to a Wi-Fi client device providing a password for a zone of a Wi-Fi network, determining a status of the Wi-Fi client device;
    when the status of the Wi-Fi client device is unknown, placing the Wi-Fi client device in a holding area associated with the zone, wherein the Wi-Fi client device is connected to the Wi-Fi network while in the holding area and has restricted access that is less than full access to the zone in an allowed zone;
    responsive to placing the Wi-Fi client device in the holding area, causing a notification to an administrator that the Wi-Fi client device is in the holding area; and
    with the Wi-Fi client device in the holding area, one of moving the Wi-Fi client device to the allowed area, moving the Wi-Fi client device to a rejected area for the zone, and leaving the Wi-Fi client device in the holding zone, based on any input or lack thereof from the administrator.

14. The non-transitory computer-readable storage medium of claim 13, wherein the steps further include
    when the status is previously allowed, placing the Wi-Fi client device in the allowed zone directly.

15. The non-transitory computer-readable storage medium of claim 13, wherein the steps further include
    when the status is previously rejected, placing the Wi-Fi client device in the rejected zone directly and providing a notification to the administrator.

16. The non-transitory computer-readable storage medium of claim 13, wherein the steps further include
providing a User Interface (UI) to the administrator via any of a Web page, a dashboard, and a mobile application, wherein the UI includes a listing of Wi-Fi client devices in the holding area for the zone.

17. A controller comprising:
a processor; and
memory communicatively coupled to the processor and storing instructions that, when executed, cause the processor to
responsive to a Wi-Fi client device providing a password for a zone of a Wi-Fi network, determine a status of the Wi-Fi client device;
when the status of the Wi-Fi client device is unknown, cause placement of the Wi-Fi client device in a holding area associated with the zone, wherein the Wi-Fi client device is connected to the Wi-Fi network while in the holding area and has restricted access that is less than full access to the zone in an allowed zone;
responsive to placing the Wi-Fi client device in the holding area, cause a notification to an administrator that the Wi-Fi client device is in the holding area; and
with the Wi-Fi client device in the holding area, one of move the Wi-Fi client device to the allowed area, move the Wi-Fi client device to a rejected area for the zone, and leave the Wi-Fi client device in the holding zone, based on any input or lack thereof from the administrator.

18. The controller of claim 17, wherein the instructions, when executed, further cause the processor to
when the status is previously allowed, cause placement of the Wi-Fi client device in the allowed zone directly.

19. The controller of claim 17, wherein the instructions, when executed, further cause the processor to
when the status is previously rejected, cause placement of the Wi-Fi client device in the rejected zone directly and providing a notification to the administrator.

20. The controller of claim 17, wherein the instructions, when executed, further cause the processor to
present a User Interface (UI) to the administrator via any of a Web page, a dashboard, and a mobile application, wherein the UI includes a listing of Wi-Fi client devices in the holding area for the zone.

* * * * *